(12) United States Patent
Goldstein

(10) Patent No.: US 9,080,550 B2
(45) Date of Patent: Jul. 14, 2015

(54) AIRBORNE WIND ENERGY CONVERSION SYSTEM WITH FAST MOTION TRANSFER

(71) Applicant: Leonid Goldstein, Agoura Hills, CA (US)

(72) Inventor: Leonid Goldstein, Agoura Hills, CA (US)

( * ) Notice: Subject to any disclaimer, the term of this patent is extended or adjusted under 35 U.S.C. 154(b) by 179 days.

(21) Appl. No.: 13/682,053

(22) Filed: Nov. 20, 2012

(65) Prior Publication Data

US 2013/0134261 A1     May 30, 2013

Related U.S. Application Data

(60) Provisional application No. 61/564,862, filed on Nov. 30, 2011, provisional application No. 61/566,681, filed on Dec. 4, 2011, provisional application No. 61/568,790, filed on Dec. 9, 2011, provisional application No. 61/577,046, filed on Dec. 18, 2011, provisional application No. 61/577,329, filed on Dec. 19, 2011, provisional application No. 61/603,318, filed on Feb. 26, 2012, provisional application No. 61/600,961, filed on Feb. 20, 2012, provisional application No. 61/609,969, filed on Mar. 13, 2012, provisional application No. 61/624,470, filed on Apr. 16, 2012, provisional application No. 61/662,476, filed on Jun. 21, 2012, provisional application No. 61/671,242, filed on Jul. 13, 2012, provisional application No. 61/680,780, filed on Aug. 8, 2012.

(51) Int. Cl.
*B64C 31/06* (2006.01)
*F03D 5/00* (2006.01)
*F03D 9/00* (2006.01)

(52) U.S. Cl.
CPC .............. *F03D 9/002* (2013.01); *B64C 31/06* (2013.01); *F03D 5/00* (2013.01); *F05B 2240/921* (2013.01); *Y02E 10/70* (2013.01)

(58) Field of Classification Search
CPC ................................. B64C 31/06; F03D 5/00
USPC .......... 244/153 R, 153 A, 154, 155 A, 155 R; 290/44, 55
See application file for complete search history.

(56) References Cited

U.S. PATENT DOCUMENTS

| | | | |
|---|---|---|---|
| 3,987,987 A * | 10/1976 | Payne et al. ................ | 244/153 R |
| 4,124,182 A | 11/1978 | Loeb | |
| 4,572,962 A * | 2/1986 | Shepard ......................... | 290/55 |
| 6,044,581 A * | 4/2000 | Shipman et al. ................... | 43/3 |
| 6,072,245 A | 6/2000 | Ockels | |
| 6,254,034 B1 * | 7/2001 | Carpenter ................. | 244/153 R |

(Continued)

FOREIGN PATENT DOCUMENTS

JP         04237877 A      8/1992

OTHER PUBLICATIONS

Canale, Massimo et al.; Power Kites for Wind Energy Generation Fast Predictive Control of Tethered Airfoils; IEEE Control Systems Magazine; Dec. 2007; pp. 25-38.

(Continued)

*Primary Examiner* — Tien Dinh
*Assistant Examiner* — Michael Wang
(74) *Attorney, Agent, or Firm* — Kelly & Kelley, LLP

(57) ABSTRACT

Airborne wind energy conversion system a with flying wing, using a cable or belt to transmit motion to a rotor of a ground based electrical generator with high velocity, achieving high aerodynamic efficiency of the wings and high power for a given torque.

28 Claims, 22 Drawing Sheets

(56) References Cited

U.S. PATENT DOCUMENTS

| | | | |
|---|---|---|---|
| 6,520,454 B2* | 2/2003 | Winner | 244/155 A |
| 6,555,931 B2 | 4/2003 | Mizzi | |
| 7,219,861 B1 | 5/2007 | Barr | |
| 7,275,719 B2* | 10/2007 | Olson | 244/155 A |
| 7,504,741 B2* | 3/2009 | Wrage et al. | 290/55 |
| 7,546,813 B2 | 6/2009 | Wrage | |
| 7,656,053 B2* | 2/2010 | Griffith et al. | 290/44 |
| 8,066,225 B1* | 11/2011 | Tigner | 244/153 R |
| 8,080,889 B2 | 12/2011 | Ippolito et al. | |
| 8,100,366 B2* | 1/2012 | Milanese et al. | 244/155 A |
| 8,109,711 B2* | 2/2012 | Blumer et al. | 415/2.1 |
| 8,113,777 B2 | 2/2012 | Vergnano | |
| 8,152,106 B2 | 4/2012 | Ippolito | |
| 2002/0040948 A1* | 4/2002 | Ragner | 244/153 R |
| 2008/0210826 A1 | 9/2008 | Ockels et al. | |
| 2010/0026007 A1* | 2/2010 | Bevirt | 290/55 |
| 2010/0117371 A1 | 5/2010 | Ippolito et al. | |
| 2011/0025060 A1* | 2/2011 | Toneaki | 290/44 |
| 2011/0210559 A1* | 9/2011 | Zanetti et al. | 290/55 |
| 2011/0278393 A1* | 11/2011 | Bland et al. | 244/1 TD |
| 2012/0104763 A1* | 5/2012 | Lind | 290/55 |
| 2014/0232114 A1* | 8/2014 | Goldstein | 290/44 |

OTHER PUBLICATIONS

Canale, M. et al.; KiteGen project: control as key technology for a quantum leap in wind energy generators; Proc. of American Control Conference, New York 2007.

Williams, Paul et al.; Optimal Cross-Wind Towing and Power Generation with Tethered Kites; AIAA Guidance, Navigation and Control Conference and Exhibit; Aug. 20-23, 2007; South Carolina, US.

Canale, Massimo et al.; Power Kites for Wind Energy Generation, Fast Predictive Control of Tethered Airfoils; IEEE Control Systems Magazine, pp. 25-38; Dec. 2007.

Loyd, Miles L; Crosswind Kite Power; J. Energy, vol. 4, No. 3, Article No. 80-4075, pp. 106-111; 1980; American Institute of Aeronautics and Astronautics, Inc.; US.

Diehl, Moritz; Wind Power Generation via Fast Flying Kites; Optimization in Engineering Center & Electrical Engineering Department; Jan. 20, 2010; 77 pgs.; K.U. Leuven, Belgium.

* cited by examiner

AIRBORNE WIND ENERGY CONVERSION SYSTEM WITH FAST MOTION TRANSFER

BACKGROUND OF THE INVENTION

This invention is generally directed to wind energy conversion systems and methods.

The classical work is the article by Miles L. Loyd "Crosswind Kite Power" (1979), in which the author disclosed a wind energy harvesting device, comprising a tethered wing, flying crosswind and harvesting wind energy, and transferring harvested energy to a ground based generator via motion of the tether. Crosswind motion of a wing is much more efficient, than downwind motion, allowing the wing to fly many times speed of wind and harvest energy from an area, many times larger than the area of the wing. Unfortunately, velocity of the lengthwise motion of the tether must be well below velocity of the wing. Moreover, Loyd proved mathematically that the optimal downwind speed of the tether is ⅓ of the wind speed, and suggested using this speed in his device. Unfortunately, the tether is subject to very high force, requiring thick tethers and creating very large torque in the ground equipment for useful power.

Other variations of airborne wind energy conversion system with a generator on the ground have been suggested. In some of them, a lift generating airfoil flies downwind, rather than crosswind. In some other systems, a drag based wind capturing device (such as a parachute canopy) is utilized. In some other systems, a combination of aerodynamic lift and drag is used to convert the wind power. And in other systems (such as described in U.S. Pat. No. 6,072,245 by Ockels), multiple airfoils are connected to a single generator. These systems share the drawback of the high force and high torque in the power transfer from wind energy capturing element to the generator.

It should be noted, that the problem of high forces and high torques is common for wind energy conversion devices, even conventional wind mills, and has not been satisfactory solved in hundreds of years.

This invention is directed to solving this problem.

SUMMARY OF THE INVENTION

In one aspect, this invention identifies the need and teaches a wind energy conversion device (WECD) and a method involving transferring mechanical power with speed, exceeding (possibly many times) speed of the wind, thus eliminating the above mentioned problem in the prior art. As used herein, "speed of power transfer" means the scalar value of the component of the velocity of the mechanical element (a cable or a belt) in the direction in which the force is applied.

A method of generating power from wind in accordance with the present invention, comprises the steps of providing a power generator on the ground or the water surface, capturing wind energy with an airborne wing, transferring captured wind energy to the power generator using a mechanical cable, sometimes referred to herein as a belt and can be of any suitable elongated member, having lengthwise speed larger than the wind speed at the altitude of the wing.

In accordance with the method of generating power from the wind by providing a power generator on the ground or the water surface, capturing wind energy with an airborne wing moving crosswind faster than the wind, and transferring captured wind energy to the power generator using a mechanical cable, preferably the cable has an angle of 45 degrees or more to the wind direction.

The invention comprises a wind energy conversion system, comprising: at least one airborne wing; an electric generator, including a rotor and a stator, on the ground or the water surface; an electronic control system; a cable or a belt transferring motion of the wing to the rotor of the generator; where the lengthwise velocity component of the cable or the belt near the ground or the water surface has a larger value than the wind speed on the altitude of the wing.

The power generator or the tether's ground attachment can be installed on a movable member, capable of slowly moving to accommodate changes in the wind direction.

The wind energy conversion system has at least one airborne wing moving crosswind faster than the wind, and an electric generator with a rotor and a stator on the ground or the water surface, may have a motion transferring cable or a belt attached to the wing and forming a small angle to the direction of wind motion. "Small angle" can be 45 degrees or less.

The wind energy conversion system having at least one airborne wing moving crosswind faster than the wind, and an electric generator with a rotor and a stator on the ground or the water surface, may have an electronic control system and a tether attaching the wing to a ground object and a motion transferring cable or a belt forming an angle of 45 degrees or more with the tether.

In these embodiments, the wing can be additionally attached to a ground based object by a tether, separate from the motion transferring cable or belt.

In one form of the invention, a device for producing electric energy from the wind power has a ground station, means for converting kinetic energy delivered by a linearly moving cable into electric energy and means for pulling and stowing the cable. The device further comprises at least two wings, both tethered to a rotating turret on top of the ground station. At least one of the wings carries a fork pulley, and another wing attached to the end of the cable, which passes through the fork pulley, going toward the ground station and moving the means for converting linear energy of the moving cable into electrical energy. The wings are soaring in the air under influence of the aerodynamic lift forces, and flying crosswind most of the time.

In the embodiments above, the wing has a form of airfoil. The wing is preferably moving at an angle 45-90 degrees to the direction of the wind for at least half of the time. The wing is flying crosswind in order to achieve higher speed. The motion transfer cable is preferably moving at angle 45-90 degrees to the direction of the wind for at least half of the time and having an angle of 45-90 degrees to the tether, if the tether is present. Instead of being attached to the wing, the motion transfer cable can be attached to the tether.

Another aspect of the invention is a method of flying a wing in WECD, in which the wing flies back and forth along an arc or a straight line, and turns around at the ends of its path by yawing (i.e. rotating around it vertical axis) with or without roll.

Another aspect of the invention is a method of flying wing in a WECD, in which the wing flies back and forth along an arc or a straight line, and turns around at the ends of its path by pitching (i.e., rotating around its lateral axis).

Another aspect of the invention is a WECD deployed in a body of water, such as a sea or an ocean, and capable of turning around an imaginary vertical axis and automatically getting into a position, optimal for wind energy capturing. The WECD comprises at least one wing, attached to two buoys, which are anchored by the same anchor, an electric generator, supported by one of the buoys and driven by the wing and an electronic control system.

Another aspect of the invention is a system for producing electrical energy from wind power in a regular way despite wind intermittence, comprising a wind energy conversion device, a short term energy storage device and a long term energy storage device. The long term energy storage device may store energy in a thermal form.

Another aspect of the invention proposes a wind energy conversion device (WECD) mechanically and aerodynamically optimized for ultimate wind energy capturing efficiency, rather than control efficiency. Microprocessor based control system takes care of control. A wing in this WECD can be an airfoil, substantially symmetrical relative to its normal-longitudinal plane. It can have substantially the same section along a large part of its span around the center. The wing moves with its leading edge forward. When capturing wind energy, in a period referred to as the working phase, the wing can move crosswind nearly perpendicular to the wind. The wing should be in the working cycle at least half of the time. When in the working cycle, the wing should move along a trajectory with a small curvature, such as a straight line or an arc of large radius. "Large radius" means large compared with the span of the wing and large enough for radial acceleration of the wing not to significantly exceed g (acceleration of free fall). The wing can fly over a closed trajectory, such as figure eight, ellipse, oval or large circle. Alternatively, it can fly along a straight line or an arc, and then perform "end of arc" maneuver, reversing its direction to opposite.

The wing can be rigid (like a wing of a plane), flexible or inflatable (like many kite wings), or even soft, like a sailboat's sail. Different materials provide different benefits. Rigid construction allows higher lift to drag (L/D) ratio, higher speed and lower wing area for the same amount of power. It is also more durable, than a flexible or soft wing. However, a flexible wing is lighter, cheaper and easier to transport and to deploy.

In this embodiment, the electrical generator is on the ground (or around the ground), or slightly above the water for marine deployment. The motion of the wing is transferred through a cable or a belt to the rotor of the generator. Some other useful qualities of this embodiment:
- It utilizes forces of aerodynamic lift (rather than drag);
- It has similar air speed in all parts of the aerodynamic surface;
- It has automatic control of the aerodynamic surfaces;
- It allows high ratio of wing speed to the wind speed;
- It has sufficiently high speed of the motion transfer element, allowing rotational speed of 1,500-1,800 RPM without a gearbox;
- It has flexibility in selecting materials, construction techniques and sizes of components;
- It uses mass produced electrical generators and other electrical equipment.

Further, this embodiment can be combined with an energy storage device to ensure reliable electrical supply independent of variations in the wind.

In some embodiments, there is only one motion transmitting cable or belt, and it is used to rotate the rotor of the generator in the working phase and is stowed in the returning phase. Electrical energy can be produced continuously by combining two or more devices with one motion transmission cable. In other embodiments, there are two motion transmission cables, attached to two wings, and most of the time one of the cables is rotating the rotor of the generator, so that electrical energy is produced continuously.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

The accompanying drawings illustrate the invention. The illustrations omit details not necessary for understanding of the invention, or obvious to one skilled in the art, and show parts out of proportion for clarity. In such drawings.

DETAILED DESCRIPTION OF THE PREFERRED EMBODIMENTS

As shown in the accompanying illustrations, for exemplary purposes, the present invention is directed to a wind energy conversion device (WECD) and related method involving transferring mechanical power with a flying wing having a cable or belt transmitting power to a rotor of a ground-based electrical generator with high velocity, exceeding the speed of the wind, achieving high aerodynamic efficiency of the wing and a high power for a given torque.

Figure 1A:
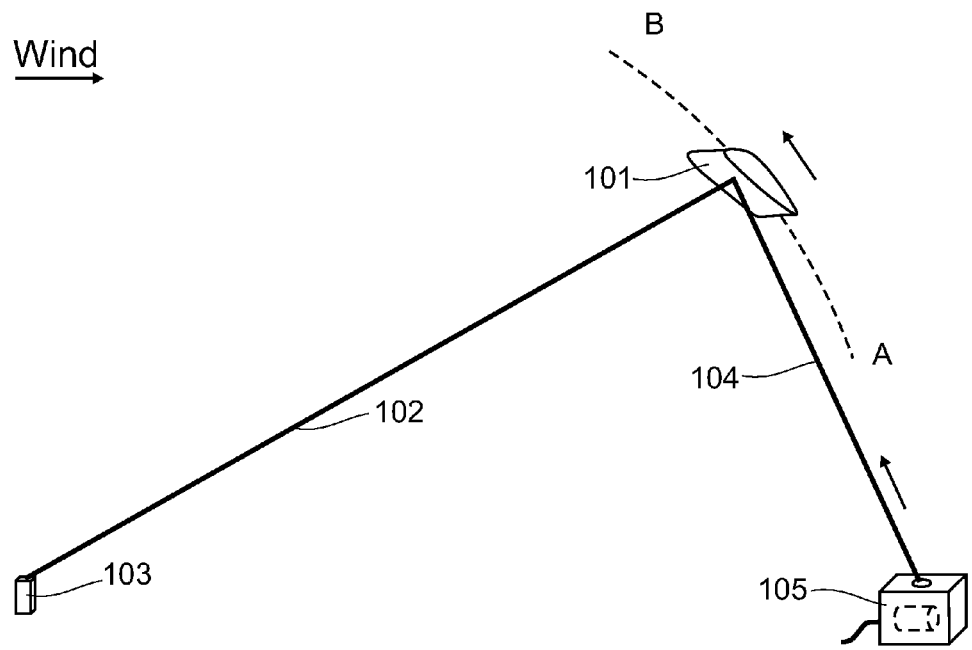
FIG. 1A is a perspective view of a wind energy conversion device (WECD) of the present invention having a tethered wing with a motion transfer cable and a ground station in a working phase.

With reference now to FIG. 1A, a WECD embodying the invention is shown in its working phase. In this embodiment of the invention, a wing 101 is placed in the air and tethered to the ground by a tether (a cable, a guy wire) 102. On the other end, tether 102 is anchored to the ground through a guy wire attachment 103, preferably raising slightly above the ground. Another cable (or a rope or a belt) 104 is attached to wing 101, and descends toward a ground station 105. Cables 102 and 104 are attached to wing 101 in such a way as not to interfere with its maneuvering in the air, especially not to interfere with its end of arc maneuver, described below. Ground station 105 comprises means for converting energy transferred by linearly moving cable 104 into electrical energy and means for pulling and stowing cable 104 in the returning phase. Such means and their combination are well known in art (from KiteGen and SkySails, especially SkySails' U.S. Pat. No. 7,546,813, among others), and therefore are explained below in only few details. Wing 101 has a control system and control surfaces that will be explained below.

In FIG. 1A, the arrows near wing 101 and near motion transmission cable 104 show direction of movement in the working phase. In the working phase the wing 101 ascends in an arc from point A to point B, pushed by the aerodynamic lift from the wind, and pulls cable 104, which moves rotor of an electrical generator in ground station 105, which produces electrical energy. Vertical component of the aerodynamic lift is directed up.

Figure 1B:
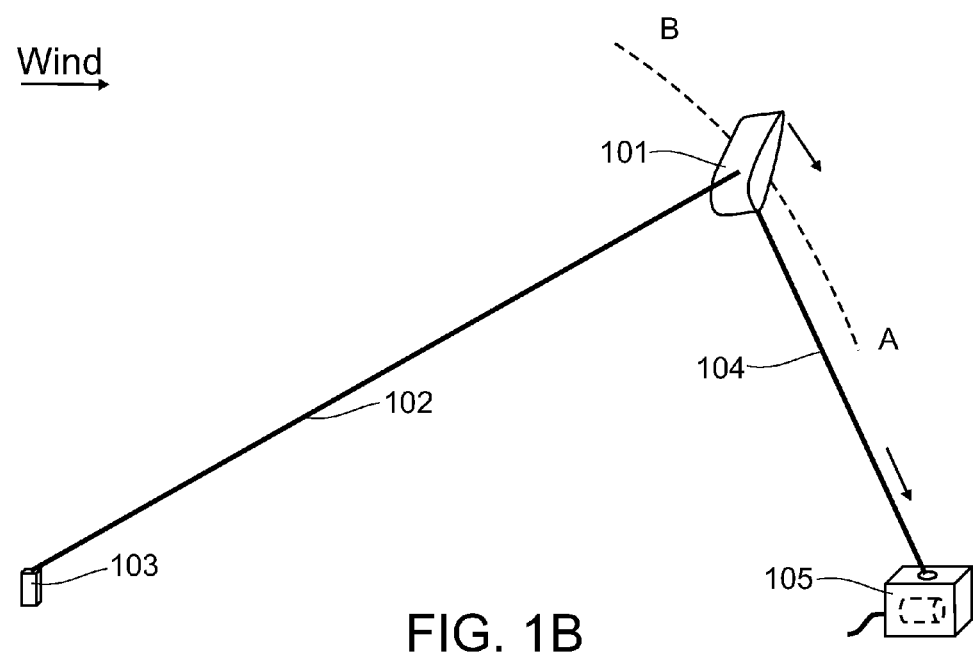
FIG. 1B is a perspective view of the wind energy conversion device (WECD) of FIG. 1A in a returning phase.

FIG. 1B shows the same device in the returning phase. Wing 101 is turned in the opposite direction, so that vertical component of aerodynamic lift is directed down. Wing 101 descends in the arc from point B to point A, pushed by the aerodynamic lift from the wind and its own weight, while corresponding means of ground station 105 pull and stow cable 104.

Notice, that the length of tether 102 in this embodiment does not change, and at any moment wing 101 moves perpendicular to the instantaneous position of the imaginary line connecting tether attachment 103 and wing 101. Ground station 105 is preferably placed in a point where a tangent to the arc AB, drawn from the middle between points A and B, touches the ground.

The one or more wings 101 can be any of the following: a rigid wing, like planes, gliders or ground based wind turbines have; a flexible wing; a soft wing; an inflatable wing; an inflatable wing, inflated by the ram air, entering it through holes; a kite wing; a paraglider wing; a wing, using soft materials, spread over a rigid frame or cables; a wing made of elastic fabric, receiving airfoil form from relative air flow; and/or a mixed wing, using different construction techniques in different parts of the wing.

Wing 101 can be made of various materials, including carbon fiber, fiberglass, wood, aluminum, aramids, para-aramids, polyester, high molecular weight polyethylene, nylon and others. Wing 101 can have various planforms; a wing, tapering to the ends in chord or thickness or both is possible (rectangular planform is shown on the drawings for clarity purposes only). Wing 101 may have wingtips to decrease turbulence and noise.

Figure 4:
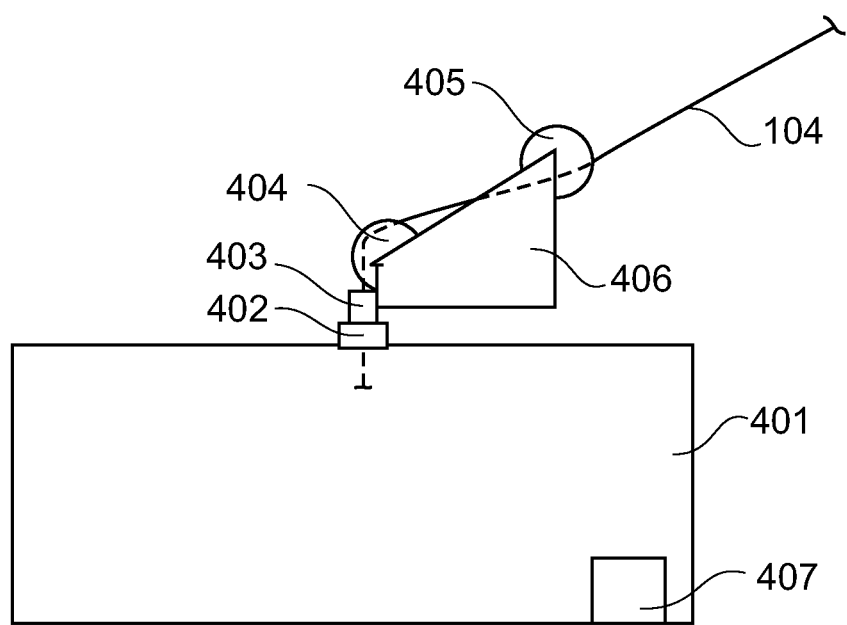
FIG. 4 is an external and schematic view of a ground station used in accordance with the present invention.
Figure 5:
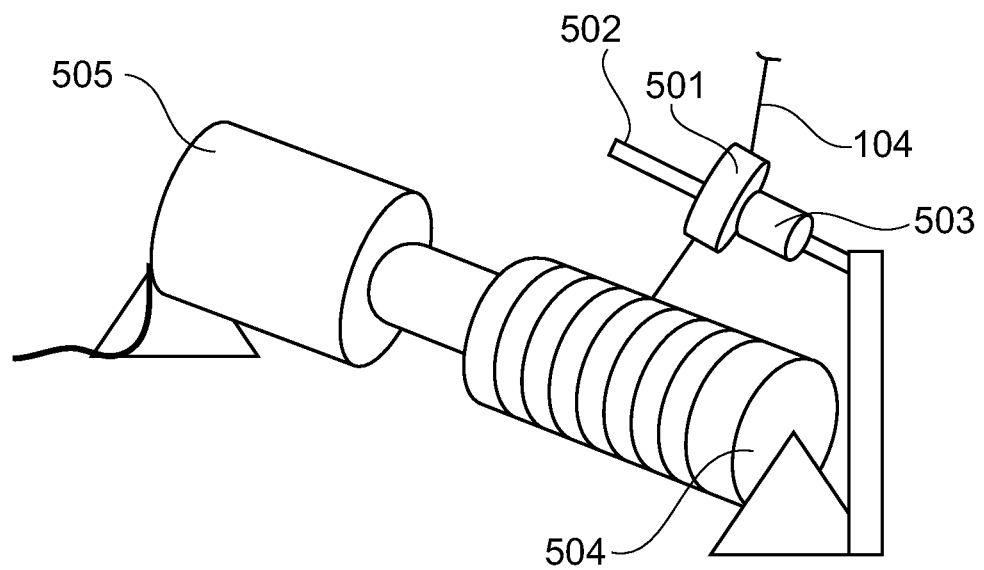
FIG. 5 is a perspective view of internal mechanical details of a ground station used in accordance with the present invention.

FIGS. 4 and 5 show parts of the ground station 105. Ground station 105 comprises a building or a body 401. On top of it, there is a retaining ring 402. A hollow shaft 403 is inserted inside of the retaining ring 402 and can rotate on ball bearings. Attached to the shaft 403 is an assembly 406 with pulleys 404 and 405. Assembly 406 can rotate with shaft 403 in the horizontal plane. The back edge of the pulley 404 remains above the hole in the shaft 403. Cable 104 passes through pulleys 404 and 405, and then through the hole in shaft 403 inside the building 401. The horizontal direction of cable 104 changes with the wind, and assembly 406 follows.

Figure 25:
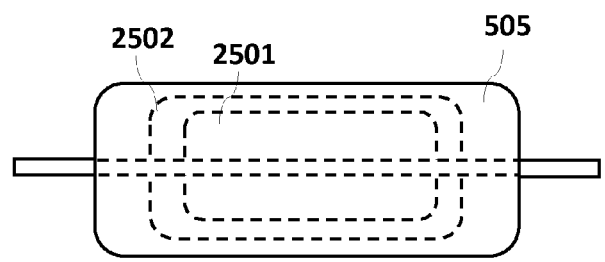
FIG. 25 is a schematic view of a generator having a rotor and a stator.

As shown in FIG. 5, inside building 401, cable 104 goes around pulley 501 and unwinds from drum 504 (in the working phase), while rotating it with force. Drum 504 transfers rotation to an electrical generator 505. As can be seen in FIG. 25, the electrical generator 505 includes a rotor 2501 and a stator 2502. Pulley 501 can move along shaft 502 under influence of the shifting means 503, winding/unwinding the cable over the whole length of the drum 504.

In the returning phase, electrical generator 505, acting as an engine, rotates the drum 504 in the opposite direction pulling cable 104 and causing it to wind about drum 504.

Figure 6:
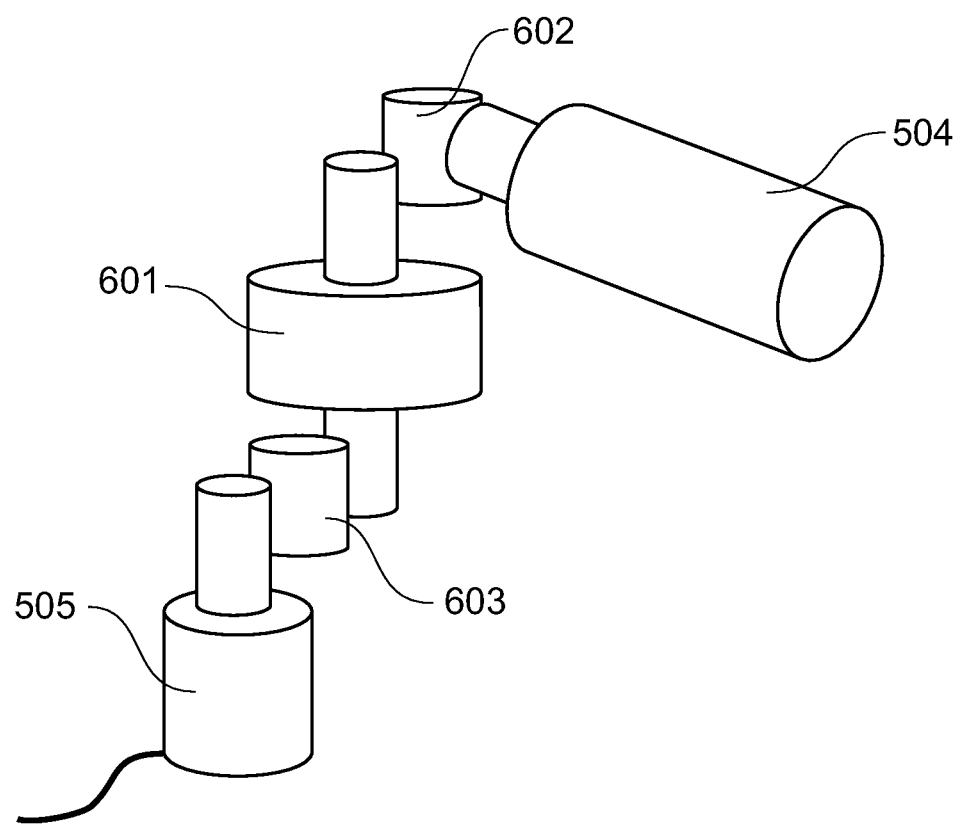
FIG. 6 is a perspective view of a flywheel and other selected mechanical details of a ground station used in accordance with the present invention.

FIG. 6 shows the system described above with an added flywheel, comprising a drum 504, a flywheel 601, mechanically connected to drum 504 through a transmission 602 with reverse gear. Flywheel 601 is mechanically connected to the electrical generator 505 through a transmission 603. Transmission 603 can be of continuously variable type in order to provide constant speed of generator rotation when flywheel 601 slows down. In this embodiment, the rotor of generator 505 rotates with constant speed all the time, producing grid quality electrical energy, not requiring further conversion. In the working phase, the drum 504 accelerates the flywheel 601. In the returning phase, the direction is reversed in the transmission 602 by engaging or disengaging the reverse gear, and the flywheel starts rotating the drum in the opposite direction, while in the same time continuing to rotate the electrical generator 505. The capacity of the flywheel should be sufficient to power the electrical engine for at least the period of the returning phase (i.e. from few seconds to few minutes). A very inexpensive steel flywheel is sufficient for that. In a more sophisticated variation, the capacity of the flywheel should be sufficient for longer time to accommodate periods of time when the wing subsystem is unable to work or cannot provide full power.

Ground station 105 might also have a control system 407, comprising a central processor or a microcontroller, optional sensors and communication means for communication with a control system 707 on the wing. Preferable communication means is a wireless network, although optical or copper wires, going through tether 102 or cable 104 can be used too. The ground sensors may include an anemometer, barometer, radar, hygrometer, thermometer, GPS, cable tension meter, RPM meter, cameras for observing the wings and other. One control system 407 can serve multiple ground stations. The control system 407 can be connected to the Internet to receive general weather information, especially warnings of extreme weather events.

Figure 7:
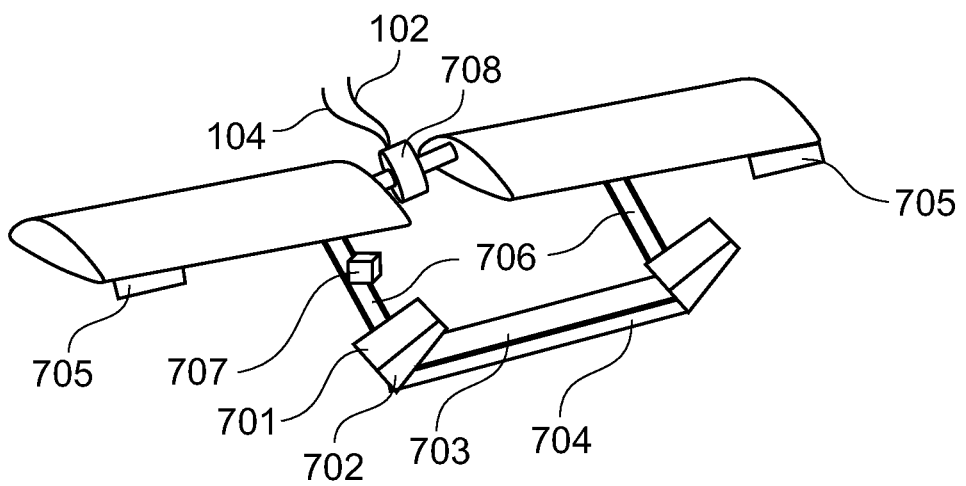
FIG. 7 is a perspective view of a wing and its control surfaces used in accordance with the present invention.

FIG. 7 shows the control system and control surfaces of wing 101. The control surfaces comprise vertical stabilizers 701, rudders 702, a horizontal stabilizer 703, an elevator 704, and ailerons 705. The control surfaces 701-704 are installed on the end of a double boom 706 and can be combined between them in various combinations (like in stabilators, V-tails etc.). Attached to wing 101 is also a control system 707. The control system 707 comprises a central processor or a microcontroller, sensors and actuators for the rudders, the elevator and the ailerons, communication means for communication with the ground, and an energy source. The wing sensors may include speed meter, altimeter, accelerometer, gyroscopic sensor, GPS, stall warning device, compass, cameras and other. The energy source can be a battery or a small turbine, working from the air flow. The cables are attached to a ring 708 that can freely rotate around its axis, keeping the cables clear of the wing. Other types of wings and control elements are possible, and some of them are discussed below.

Proceeding to the operation of the described system, let us define axis in the space: X—direction of the wind, Y—vertical axis, Z—perpendicular to X and Y.

Since tether 102 has a fixed length in this embodiment, wing 101 moves along imaginary arc AB with a center in attachment 103. The arc can be in different planes, at different angles to vertical. For the simplicity of explanation, let us assume that the arc is in the vertical plane. If the vector with beginning at attachment 103 and ending at ground station 105 is parallel to the wind vector, the left and the right tip of the wing are on the same level. In the working phase, the angle of attack of the wing should be between 0 and 20 degrees. It is achieved when the wing's chord is at angle 70-89 degrees to the wind, and the 'tip ratio' (the ratio of the wing speed to the speed of wind) can be between 4 and 30, resulting in the typical wing speed of 20-200 m/s. Notice, that the whole wing moves with that speed, not only the tip of the wing, as in usual wind turbines. Motion transfer cable 104 is pulled behind wing 101 with speed, almost equal to the speed of the wing and nearly perpendicular to tether 102. For higher efficiency, higher tip ratio is preferred, subject to well known limitations, including: soft wings typically have low quality, limiting tip ratio; higher speeds of the wing cause excessive noise, which might be unacceptable at low altitudes; operationally, speed of the wing may be limited to certain maximum, corresponding to the nominal generator capacity; and the speed of sound, etc.

The lift force, acting on the wing, is perpendicular to the wing's chord. Some of it (typically a relatively small part) compensates for gravity force acting on the wing. The rest can be resolved into two components: the component acting along tether 102 is compensated by the tether; and the component acting along cable 104, pulls cable 104 and supplies mechanical energy to the electrical generator.

The operating cycle of the system consists of a working phase and a returning phase. In the working phase, the wing ascends from point A to point B under influence of aerodynamic lift force. In the working phase cable 104 rotates drum 504 which rotates the rotor of the electrical generator 505, which produces electricity.

In the returning phase, the wing descends from point B to point A under influence of aerodynamic lift and gravity. Drum 504 pulls the cable 104 with small force while the wing descends. Electricity is not generated in the returning phase. The returning phase may be shorter than the working phase, because the wing does not have to spend power on rotating the generator. For the same reason, camber of wing 101 can be optimized for higher L/D in the ascending move in this embodiment.

Figure 8:
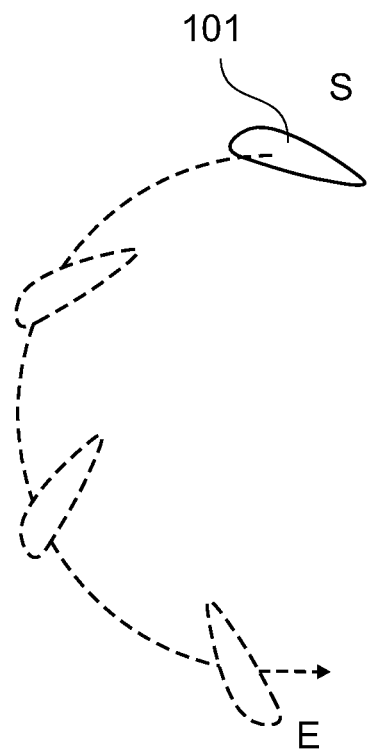
FIG. 8 is a schematic view of a wing pitch maneuver in the end of a trajectory in accordance with the present invention.

To transfer from the working phase to returning phase, wing 101 'turns over' at point B. In one embodiment, it pivots along its lateral axis (pitches), as shown in FIG. 8. FIG. 8 is a schematic view of the wing from its side in an inclined plane, in which the wing moves initially from the right to the left (the point S for Start) at a small angle to the relative air flow. At the end of the maneuver (the point E for End) the wing moves in the opposite direction, again at a small angle to the relative air flow. A similar maneuver is performed at the point A to transfer from the returning phase to the working phase.

This system uses tether 102 to resist large wind forces acting on wing 101, and a separate motion transfer cable 104 to transfer power from wing 101 to ground generator 105 with high speed and low force.

Wing 101 is controlled automatically during its flight, adjusting to changing wind and performing required maneuvers in the points A and B. Wing 101 can move in the vertical plane or at an angle to the vertical plane. Multiple wings can operate on different trajectories from the same ground station 105.

This system does not require wind direction to be strictly along the vector ground attachment 103 to ground station 105. It can work as long as the vector of the wind is at angle of less than 90 degrees to this vector. If the wind blows at an angle, the wing's lateral axis is inclined to the horizontal plane, while the angle of attack of the wing is still between 0 and 20 degrees and angle between the wing's chord and the wind is between 70 and 89 degrees.

In this embodiment, if the wind starts blowing in the opposite direction, the operation of the device stops and the control system, described below, should do one of the following actions: stop the wing: turn wing 101 into the wind and fix cable 104 at the ground station, so that the wing is fixed in two axis and control inputs prevent it from moving in the third one; or pull wing 101 down to the ground.

Also, wing 101 is stopped or brought down to the ground in case of extreme weather conditions (hurricanes, very strong or very weak winds, thunderstorm) and for maintenance.

Because of its high speed (meaning velocity component in the direction of the applied force), cable 104 can rotate the generator's rotor with 1500-1800 RPM, required by most generators for standard frequency electricity production, without a bulky and expensive gearbox. Since Power=Force×Velocity, the high speed of the cable 104 in the direction of the force that it develops (the scalar value of the lengthwise component of the velocity), translates into lower forces, acting on the cable itself and the elements of the ground station 105.

The control system comprises the control systems 407 and 707. It provides control inputs, ensuring stable and coordinated movement of the wing 101. In some embodiments, the control system 407 is responsible for general operation of the system and transmits commands to the wing, while the control system 707 of each wing is responsible for generating commands to each actuator of the wing. The control system 707 also transmits data from its sensors to the control system 407.

One advantage of this system of the invention over existing kite or tethered wing generators is achieved through much higher lengthwise speed of cable 104, transferring mechanical energy of the moving wing to the energy producing means. For example, the linear speed of the cable of the currently publicized by KiteGen devices is close to 2 m/s, while the linear speed of the cable in the embodiment described above can be anywhere between 20 m/s and 200 m/s. Higher speeds translate into proportionally lower forces on the mechanical elements and higher RPMs, eliminating need in a gearbox. This leads to much lower costs and higher reliability. There are other advantages, such as more responsive and reliable control system, wider choice of wings, less wing stress and more.

An advantage of this system over traditional horizontal axis wind turbine is that it allows to use wind resources over wide range of altitudes, rather than only just above the ground. Thus, it can produce a much larger amount of energy using the same amount of land. Moreover, the winds at higher altitudes carry more energy and are much more stable. That solves one of the main problems of wind power generation—unreliable and unpredictable energy output. Flying the wing at higher altitude also eliminates the danger of hitting birds. Another advantage of this system is that it does not require a tower, a nacelle or a gearbox. Another advantage is that the tether and the motion transfer cable dampen excessive forces, caused by the wind gusts, allowing for lighter and less expensive construction. Another advantage is that the wing has the same tip ratio over all its length, while only the tip of a horizontal-axis wind turbine (HAWT) blade has the maximal speed.

Tether 102 and cable 104 in FIGS. 1A and 1B are not straight, but drop down under their own weight. The drop of cable 104 is useful, as it dampens quick changes in the forces acting on the wing and transferred by cable 104 to the rotor of the generator and other mechanical elements of ground station 105. However, the drop of tether 102 can be harmful, as it would cause tether to touch ground in the lower parts of the wing arc, especially when long tether for high altitudes is used.

Figure 2:
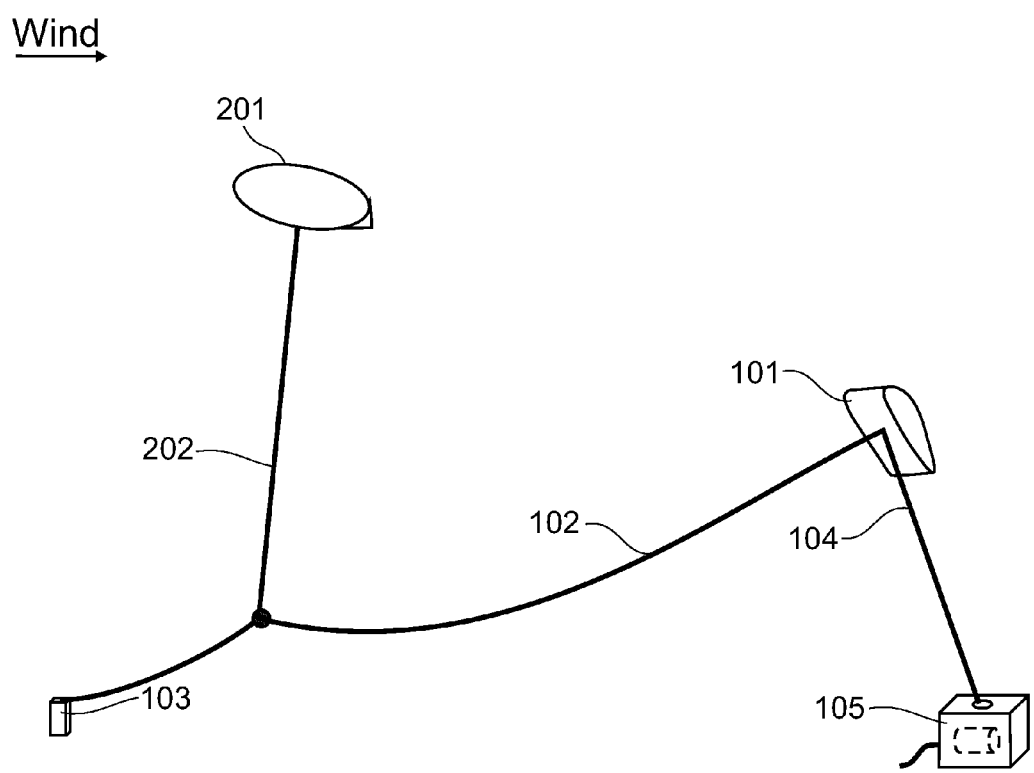
FIG. 2 is a view of the WECD of FIG. 1 with a supporting kytoon.

FIG. 2 shows a variation of the system described above, in which tether 102 is supported by one or more balloons or kitoons (kite-balloons) 201 through support cables 202. Balloons or kitoons 201 in this embodiment can also help to raise wing to the air and to smoothly bring it down to the ground when this operation is performed. Such a system with a single fixed ground attachment 103 is most effective for sites in which most of useable wind energy come delivered by winds, blowing within a sector of 120 degrees.

Figure 3A:
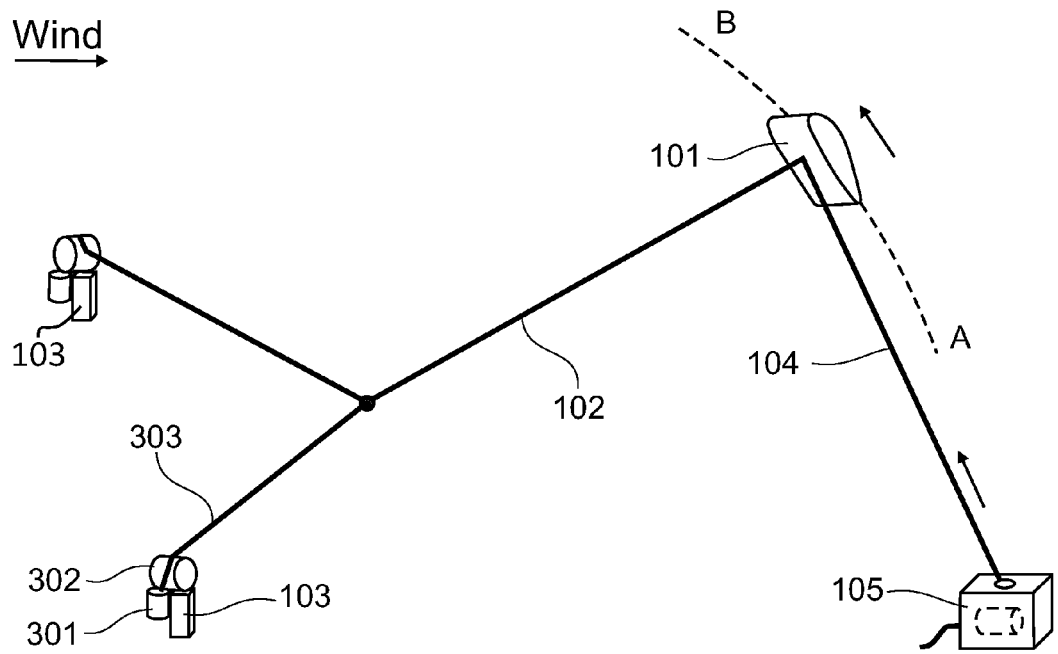
FIG. 3A is a perspective view of a WECD of the present invention adapted to work with winds from many directions.
Figure 3B:
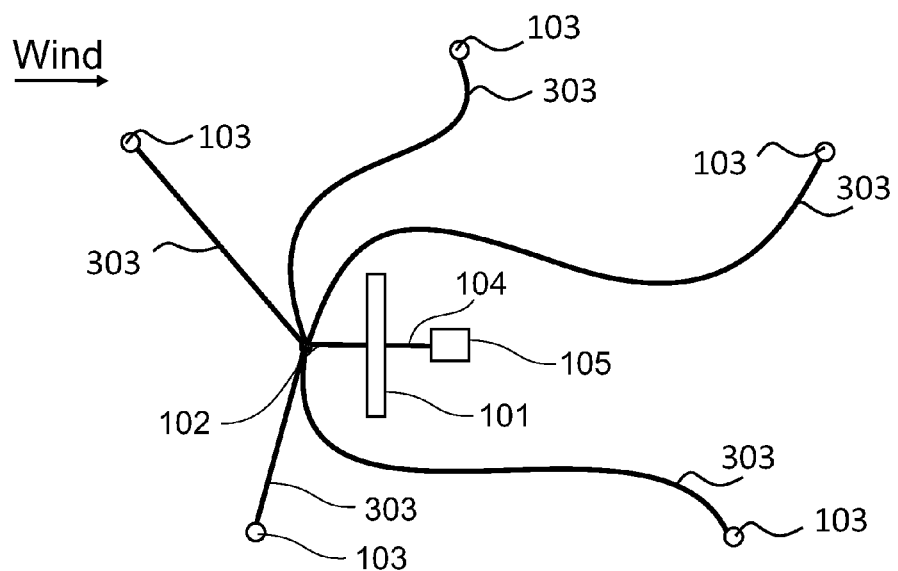
FIG. 3B is a top schematic view of a WECD of the present invention adapted for winds from all directions.

FIG. 3A shows another embodiment, allowing to use winds blowing from any direction. In this embodiment, at least one ground attachment 103 is equipped with a small engine 301 and a pulley 302. This motorized pulley, automatically operated by the control system, can slowly (compared with the speed of the wing) change length (by pulling in or releasing) of a cable 303, connected to tether 102, thus changing the horizontal direction of tether 102 and its 'effective attachment point'. FIG. 3A shows two such motorized ground attachments with motorized pulleys. Free lengths of cables 303 determine horizontal position of tether 102. Notice, that motorized ground attachments can be placed either on one side of ground station 105 (so that angle with vertex at the ground station and rays passing through attachment points is less than 90 degrees), or on both sides (the angle more than 90 degrees), or even with the ground station 105 between the motorized ground attachments. For finer control, there may be multiple motorized ground attachments. FIG. 3B shows top view of such system with five motorized ground attachments, allowing effective work of the system with wind from any direction. The curved lines show cables 303 that are not bearing load. This embodiment allows using balloons or kites to support tether 102.

Figure 9:
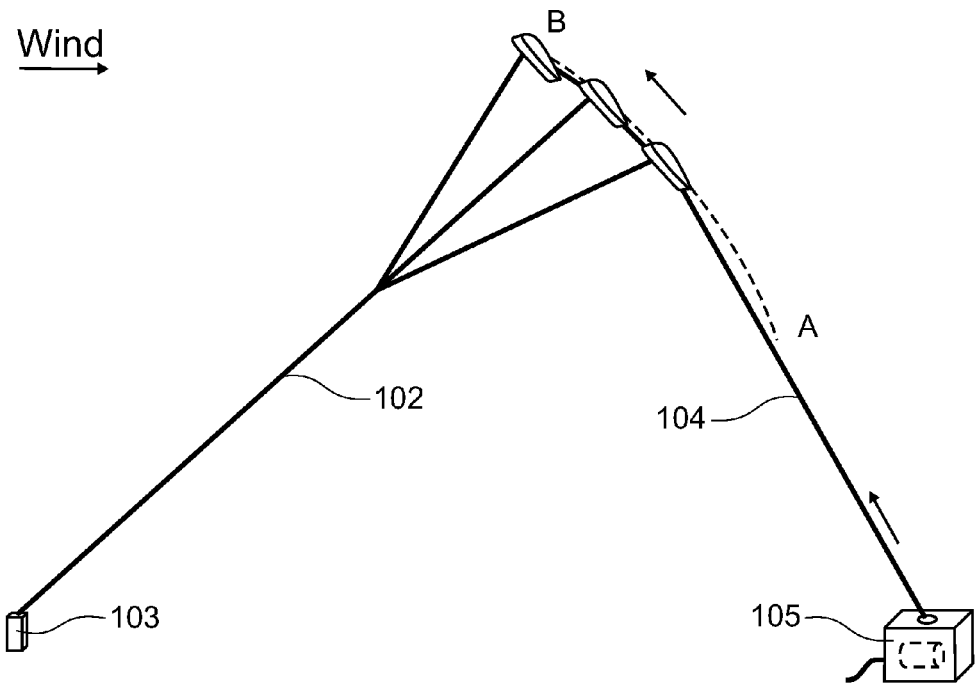
FIG. 9 is a perspective view of a WECD with multiple wings in accordance with the present invention.

FIG. 9 shows another variation of the previously described system, in which a wing train, assembled from separate wings, connected one to another, is pulling cable 104. The wings in the train should be spaced far enough from each other to minimize aerodynamic interference.

Figure 10A:
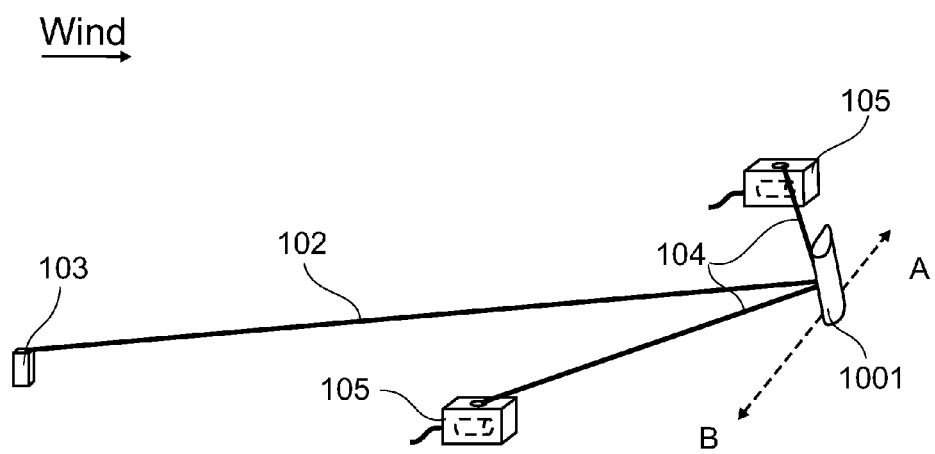
FIG. 10A is a perspective view of a WECD with two ground stations in accordance with the present invention.
Figure 10B:
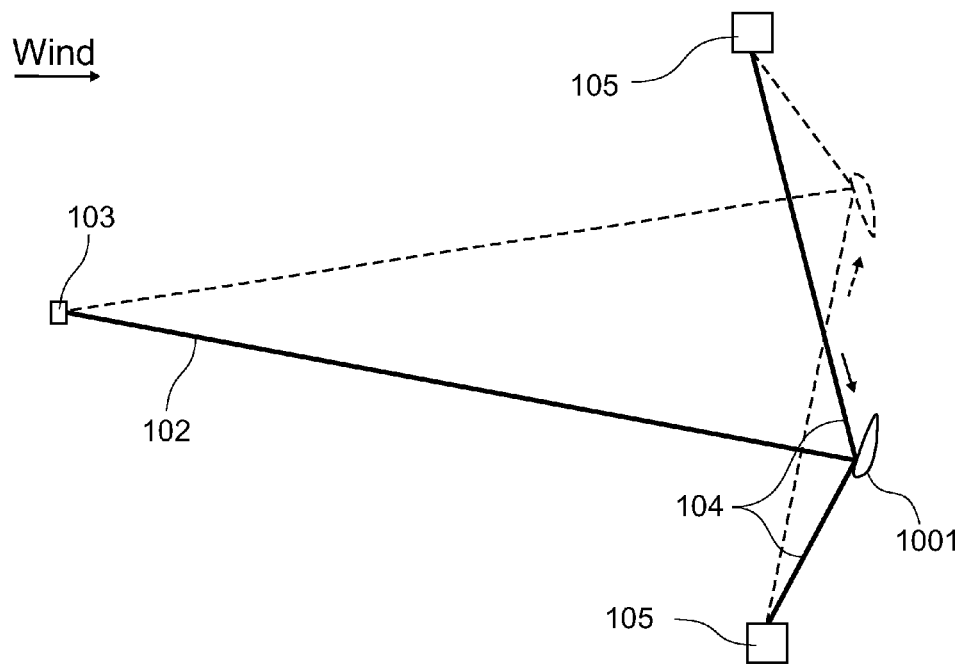
FIG. 10B is a top schematic view of the WECD of FIG. 10A with two ground stations.

FIG. 10A (perspective view) and FIG. 10B (schematic top view) show another embodiment of the invention, having two motion transfer cables 104. In this embodiment, a wing 1001 is placed in the air and tethered to the ground by tether 102. On the other end, cable 102 is anchored to the ground through attachment 103, preferably raising slightly above the ground. Two cables 104 are attached to wing 1001, each of them descends toward corresponding ground station 105. Tether 102 and cable 104 are attached to wing 1001 in such a way as not to interfere with its maneuvering in the air, especially not to interfere with its end of arc maneuver. In this embodiment wing 1001 moves along arc AB, where the points A and B are on the same altitude, when the wind is perpendicular to the line, connecting ground stations. This embodiment has a cycle with two working phases: when wing 1001 moves from A to B (solid lines on FIG. 1B), it pulls the first cable 104 and the first ground station 105 generates energy; when wing 1001 moves from B to A (dashed lines on FIG. 1B), it pulls the second cable 104 and the second ground station 105 generates energy. In the points A and B wing 1001 performs the maneuver. By connecting both ground stations in the same phase to an outside consumer (such as an electrical grid), it is possible to supply continuous energy to that consumer from one device.

The angle of attack of the wing in the working phase should be between 0 and 20 degrees. It is achieved when the wing's chord is at angle 70-89 degrees to the wind. The lateral axis of wing 1001 is always slightly inclined to vertical, with the upper tip of the wing being closer to the attachment point than the lower point. This is done for the aerodynamic lift to compensate for the weight of the wing. Wing 1001 is preferably non cambered (symmetrical). Wings 1001 move crosswind and pull cables 104 lengthwise with speed, exceeding speed of the wind.

This embodiment is most effective, when most of the useful winds come from narrow sector of 30-60 degrees. Two ground stations 105 should be situated in such way that a line, drawn between them, is perpendicular to the average direction of the useful winds (weighted by the usable energy), and attachment 103 is situated at the equal distance between them. Also, this embodiment can be easily turned into embodiment from FIG. 1A by releasing load from one of the cables 104 (or removing that cable 104 altogether). This is useful to operate this embodiment when the wind is outside of the optimal sector. In most other respects, this embodiment is similar to the one depicted in FIG. 1A, and can benefit from the same refinements as described above. Two wings 1001 with separate cables and tethers can be attached to one pair of ground stations 105 and move in counter phase at different heights, ensuring full utilization of both stations at any time.

Figure 11:
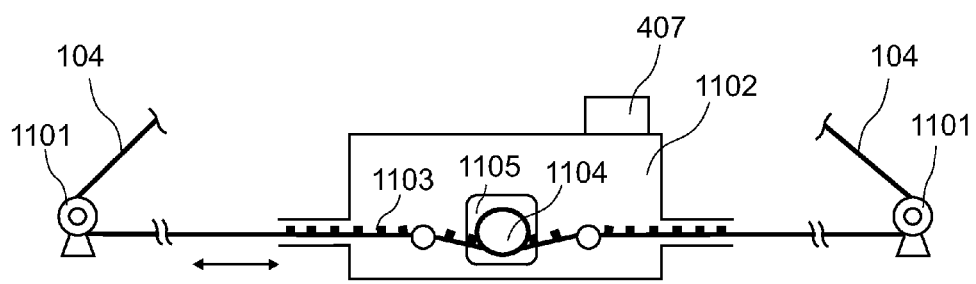
FIG. 11 is a sectional and schematic view of a portion of a WECD with a single ground station and two pulleys in accordance with the present invention.

FIG. 11 shows another variation of the system with two motion transfer cables 104. In this variation, cables 104 run through two pulleys 1101. A building or a body 1102 is placed between pulleys 1101. It houses an electrical generator 1105 and control system 407. Cables 104 are connected by and move a cog belt 1103 that rotates a cog wheel 1104. Cog wheel 1104 rotates the rotor of generator 1105 through a transmission having a reverse gear. Engaging and disengaging reverse gear ensures that the rotor of generator 1105 always rotates in the same direction. Compared with FIG. 10A, pulleys 1101 are used instead of ground station 105, while other parts remain the same. This embodiment allows to use single electrical generator and does not require drums: when the first cable 104 is pulled up, it pulls down the second cable, and vice versa. A variation of this system can use a linear electrical generator instead of cog belt 1103 and usual generator 1105.

Figure 12:
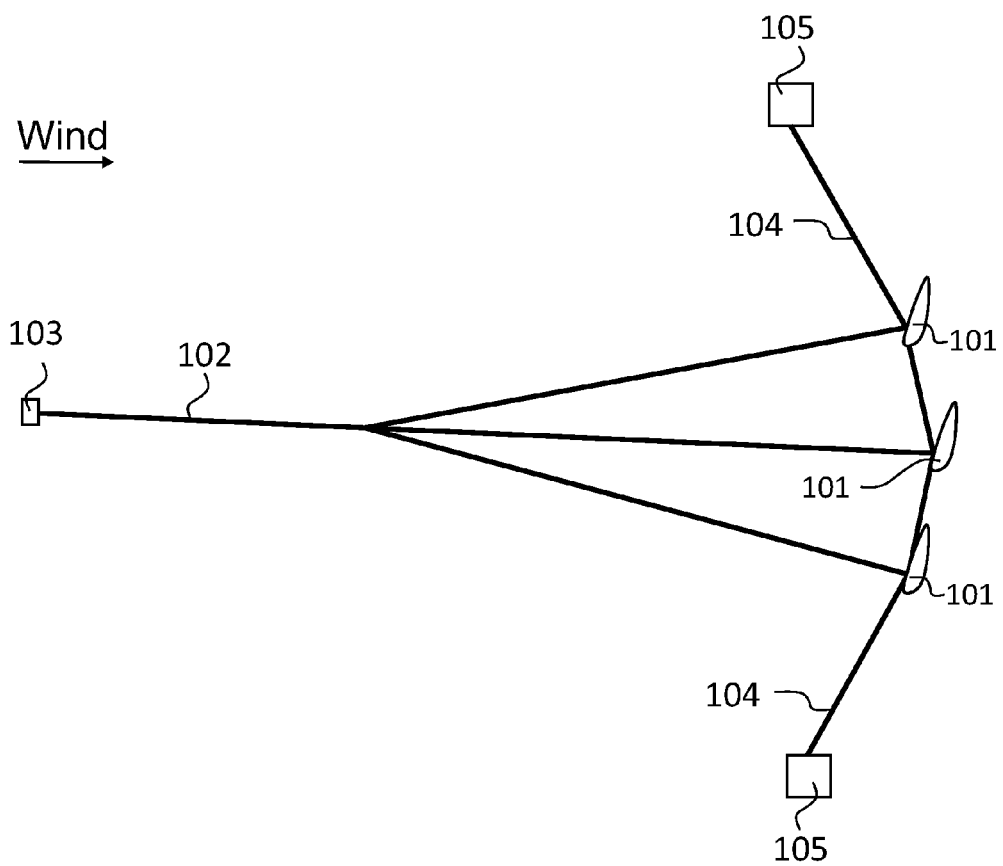
FIG. 12 is a top schematic view of WECD with two ground stations and multiple wings in accordance with the present invention.

FIG. 12 shows a variation of this system, in which a wing train, assembled from separate wings, connected one to another, is pulling two cables 104, running to ground stations 105 or through pulleys 1105. The wings in the train should be spaced far enough from each other to minimize aerodynamic interference.

Figure 13A:
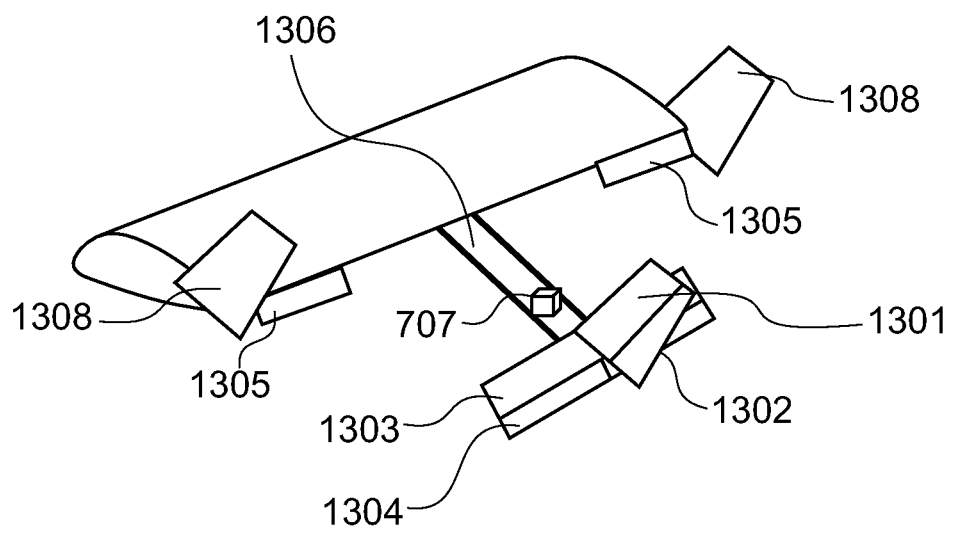
FIG. 13A is a perspective view of a wing and its control surfaces used in accordance with the present invention.
Figure 13B:
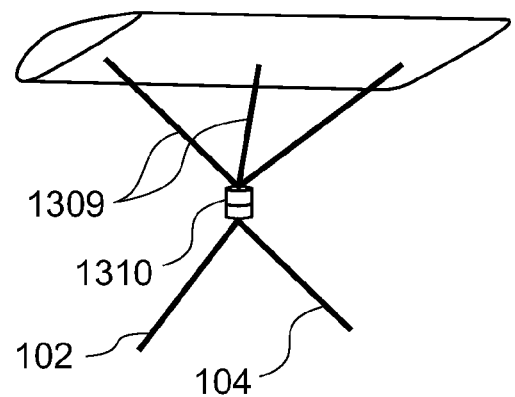
FIG. 13B is a perspective view of details of a wing used in accordance with the present invention, depicting its attachment and cables.

FIG. 13A and FIG. 13B show another form for the wings 101 and 1001. FIG. 13A focuses on the control system and control surfaces, while FIG. 13B shows connection of tether 102 and cable(s) 104, omitting details shown in FIG. 13A. The control surfaces include a vertical stabilizer 1301, a rudder 1302, a horizontal stabilizer 1303, an elevator 1304, and ailerons 1305. The control surfaces 1301-1304 are installed on the end of the boom 1306 and can be combined between them in various combination (like in stabilators, V-tails etc.). Attached to the wing is also a control system 707.

Additionally, spoilers 1308 are attached near the tips of the wings. Spoilers 1308 help the wing to perform sharp turns in the plane of the wing (yaws) without significant roll. Such turns are useful at the ends of the trajectory. For example, to perform left yaw turn, the left spoiler is rotated to become nearly perpendicular to the airflow direction (in addition to the action of the rudder 1302).

Referring to FIG. 13B, the wing has multiple suspension cables 1309, that distribute load evenly through the surface of the wing. The suspension cables are attached to the top part of a device 1310, (that can consist of upper and lower sleeves, inserted one into another), that can freely rotate against the lower part of it. Tether 102 and cable(s) 104 are connected to the lower part of the device 1310.

Figure 14:
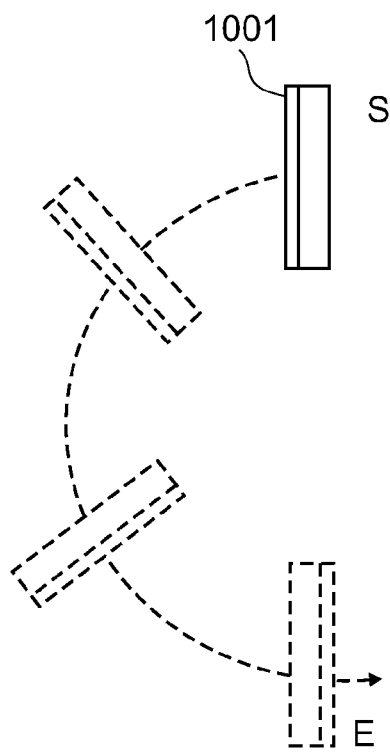
FIG. 14 is a schematic view of a wing yaw maneuver at the trajectory end in accordance with the present invention.

FIG. 14 shows a maneuver, performed by the wing, depicted in FIG. 13A and FIG. 13B in the end of trajectory (the point A or the point B). In this embodiment, it moves in its own plane (yaws), with or without roll. FIG. 14 is schematic view of the wing from its top, where the wing moves initially from the right to the left (the point S). The leading edge of the wing is shown in double line. In the end of the maneuver (the point E) the wing moves in the opposite direction. While wing is turning, the angle of attack of the wing is kept constant.

Figure 15:
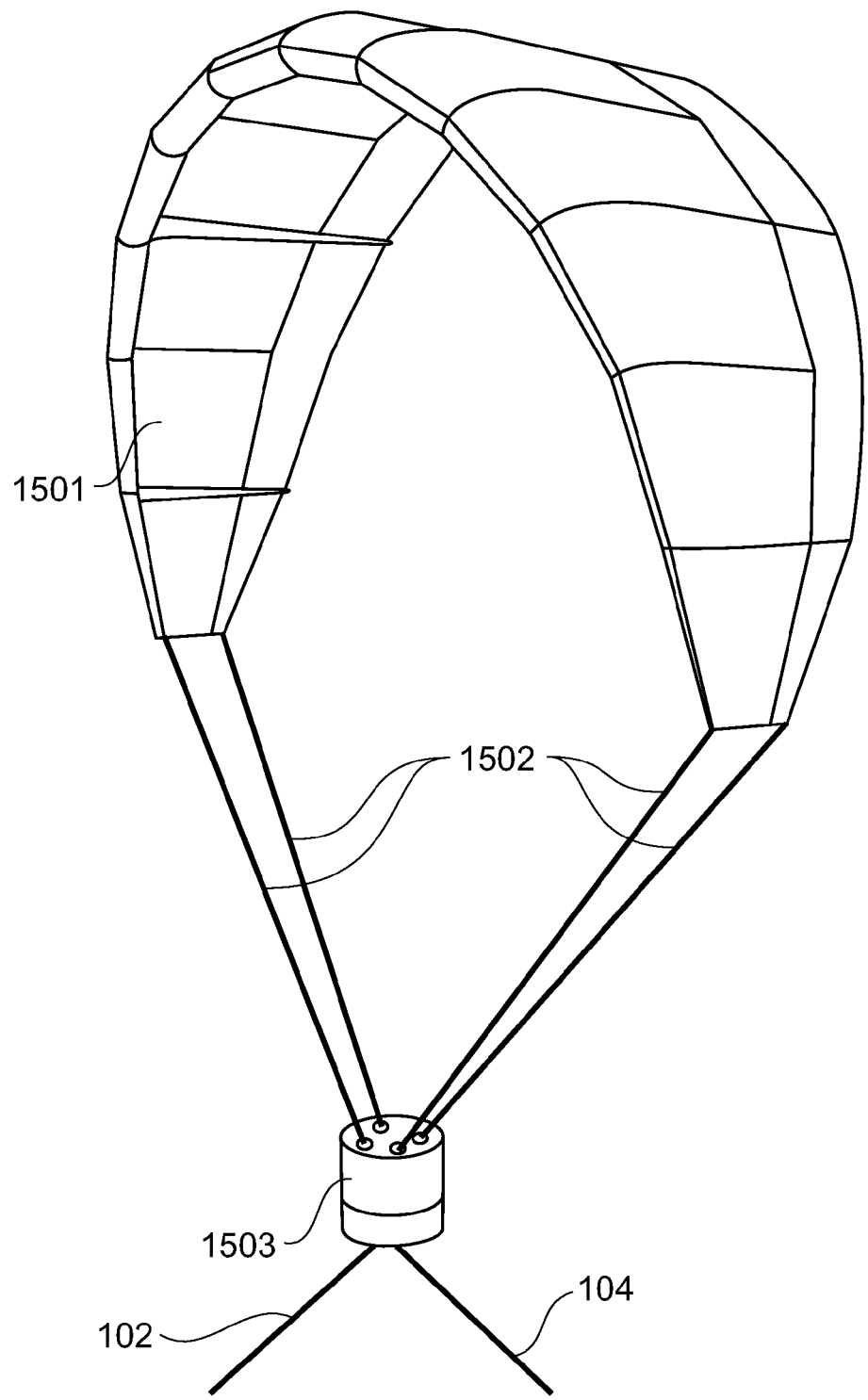
FIG. 15 is a perspective view of a flexible wing with cable controls used in accordance with the present invention.

FIG. 15 shows another form for wings 101 and 1001. It comprises a flexible inflatable canopy 1501, at least four combined control and suspension cables 1502 and a control device 1503. In this form, position of the wing relative to the wind and to the horizon is controlled by dynamically changing the lengths of cables 1502. This control device can be used alone or combined with some control surfaces from FIG. 13A. This method of control allows to change angle of attack, angle to the ground, course and make the wind to fly in the opposite direction. End of arc maneuver is performed by yawing.

Figure 16:
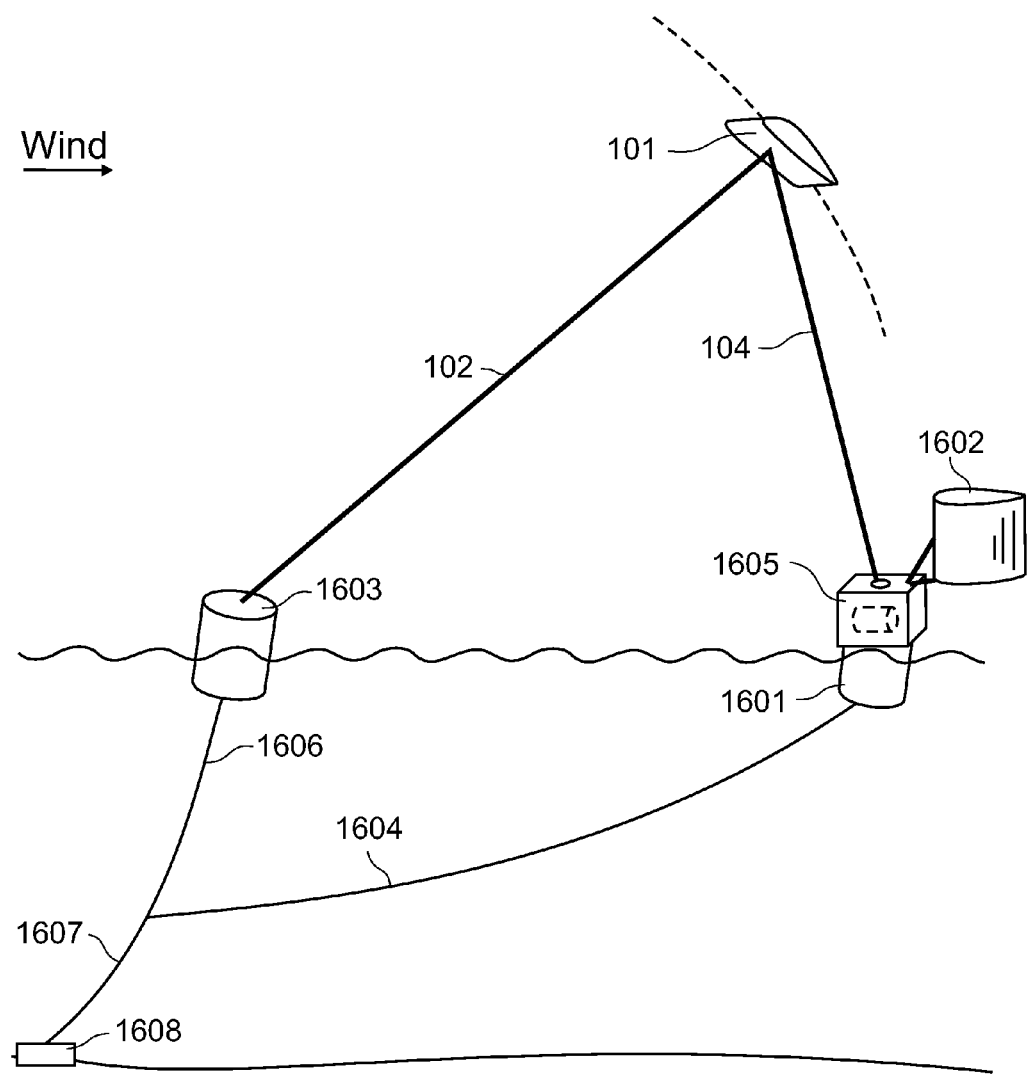
FIG. 16 is a perspective view of a self-rotating marine WECD in accordance with the present invention.

FIG. 16 shows another aspect of the invention—a wind energy conversion device designed from ground up for operating in a body of water marine environment—seas, lakes and oceans. With this aspect of the invention, large wind energy conversion devices can self-align along the ever changing wind by turning in the water, which provides support, lubrication and dampening of oscillations. These features can be provided on the land only using expensive yaw devices, and only for small size objects, such as HAWT nacelle. This is in combination with high speed of motion transfer, allowing low forces and torques, and thus lightness of construction. FIG. 16 shows an embodiment, similar to the embodiment in the FIG. 1, but in marine environment and with the following changes. A buoy 1603 is provided, and tether 102 is attached to it. Wing 101 is attached by tether 102. A generating station 1605, similar to ground station 105, is provided, and it is attached on the top of another buoy 1601. Generating station 1605 has an electrical generator that has a rotor that is brought to motion by cable 104. The generator generates electrical energy that is transferred to the consumers through underwater electrical cable. A symmetrical wing or sail 1602 attached to this construction in such a way, that it orients station 1605 along the wind, and pushes it away from buoy 1603, counteracting horizontal component of the force, exacted by cable 104. There is a bottom anchor 1608 with a chain 1607. Buoy 1601 is attached to the end of chain 1607 with a cable (or chain) 1604. Buoy 1603 is attached to the end of chain 1607 with a cable (or chain) 1606. It is easy to see, that in the constant wind, chains 1604 and 1606 and buoys 1601 and 1603 will be in the same plane—the plane of the wind. As the wind shifts, buoys 1603 and 1601 will follow. This allows the device to be in the optimal position regarding the wind most of the time. Water also dampen horizontal and vertical oscillations. Preferably, the wing's trajectory lies downwind from buoy 1601.

Figure 17A:
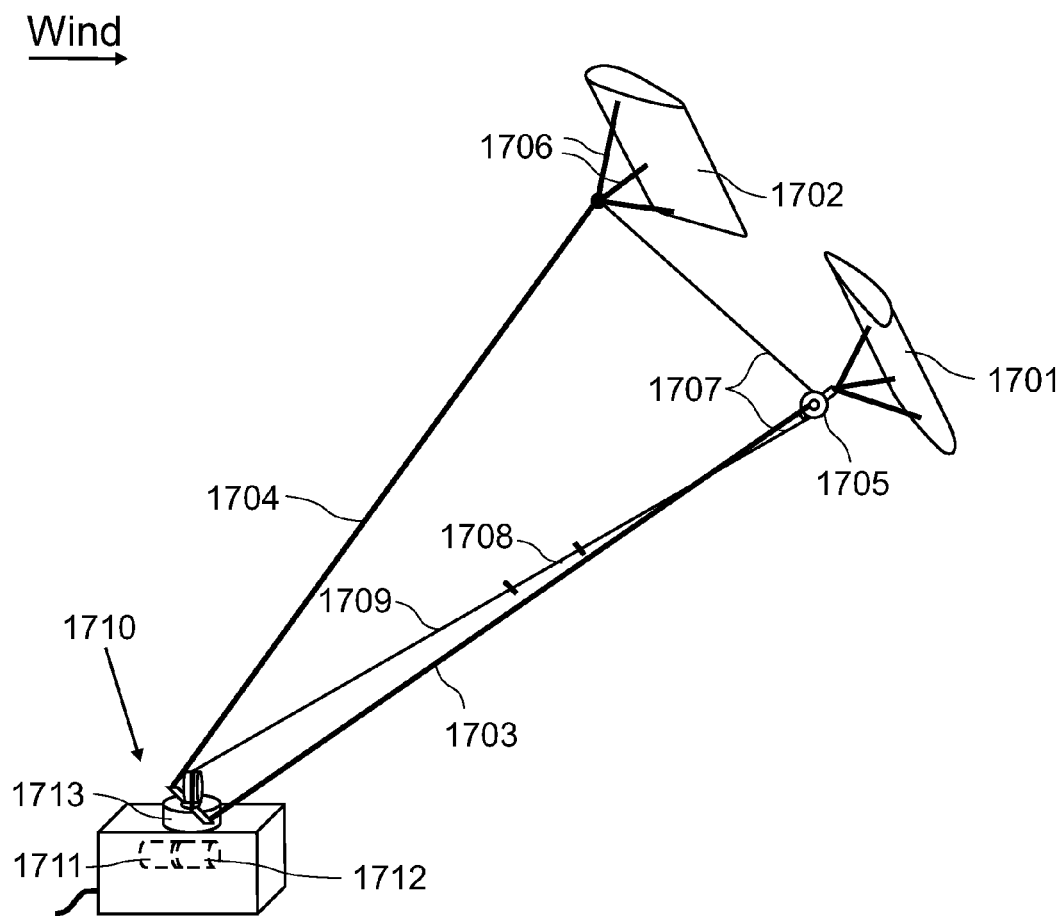
FIG. 17A is a perspective view of a WECD embodying the invention with two wings and a fork pulley.

FIG. 17A shows another embodiment of the invention. In this embodiment, a leading wing 1701 and a following wing 1702 are placed in the air. A leading wing 1701 is attached to a rotating structure on the ground or on top of a ground station by a tether (otherwise called a cable, a cord or a rope) 1703 and a following wing 1702 is attached to a rotating structure 1713 on the ground or on top of a ground station by a tether (otherwise called a cable, a cord or a rope) 1704. Wings 1701 and 1702 can be similar or dissimilar. Possibly, each tether is attached to its wing through suspension lines (or wing struts) 1706 to distribute load evenly over the wing. Leading wing 1701 carries a fork pulley 1705. Fork pulley 1705 is preferably attached to tether 1703, or between tether 1703 and suspension lines 1706. A cable 1707 is attached to wing 1702 preferably at the upper part of tether 1704, passes through fork pulley 1705, then connected to an optional extending cable (or a cord) 1708. Extending cable 1708 is connected to a cable (or a belt) 1709. Cable 1709 goes to the ground station 1710, which comprises means 1711 for converting energy transferred by the moving cable into electrical energy and means 1712 for pulling and stowing cable. The cable 1709 moves means 1711, causing them to produce electrical energy. The means 1711 and 1712 and their combination is well known in art and further explained above. The wings 1701 and 1702 comprise their control systems and control surfaces that are similar to those described above.

The wings 1701 and 1702 can be similar to wing 101, described above and shown in FIG. 7, 13, 15. Ground station 1710 is similar to ground station 110, described above, and has the same internal mechanisms.

Cables 1707, 1708 and 1709 can be parts of the same physical cable. Nevertheless, cable 1709 has two roles: winding about drum 504 of the ground station and withstanding tension created by the working wings, while the extending cable 1708 has only one role—withstanding the tension. Cable 1707 has to withstand the tension and possible slip through pulley 105. Therefore, cables 1707, 1708 and 1709 can be manufactured from different materials and/or in different shapes. Further, the cable 1709 is likely to wear faster, and it can be replaced in time of maintenance, separately from other cables. Cable 1707 can have aerodynamic form in section in order to minimize losses to air resistance. The system operator can configure the altitude, on which the wing subsystem would work, by selecting extending cable 1708 of appropriate length. Also, the system operator can choose a very long extending cable 1708, and the control system 407 will be selecting optimal operating altitude for the wings dynamically, based on the wind speed and wind quality at any given time. Thus, the wind energy would be supplied for most of the time, overcoming one of the main shortcomings of the wind turbines—their dependence on the irregular wind at the ground level. Each wing 1701 and 1702 should be able to rotate in its plane at least 180 degrees relative to its tether, and preferably rotate in its plane without limitation of angle.

Figure 17B:
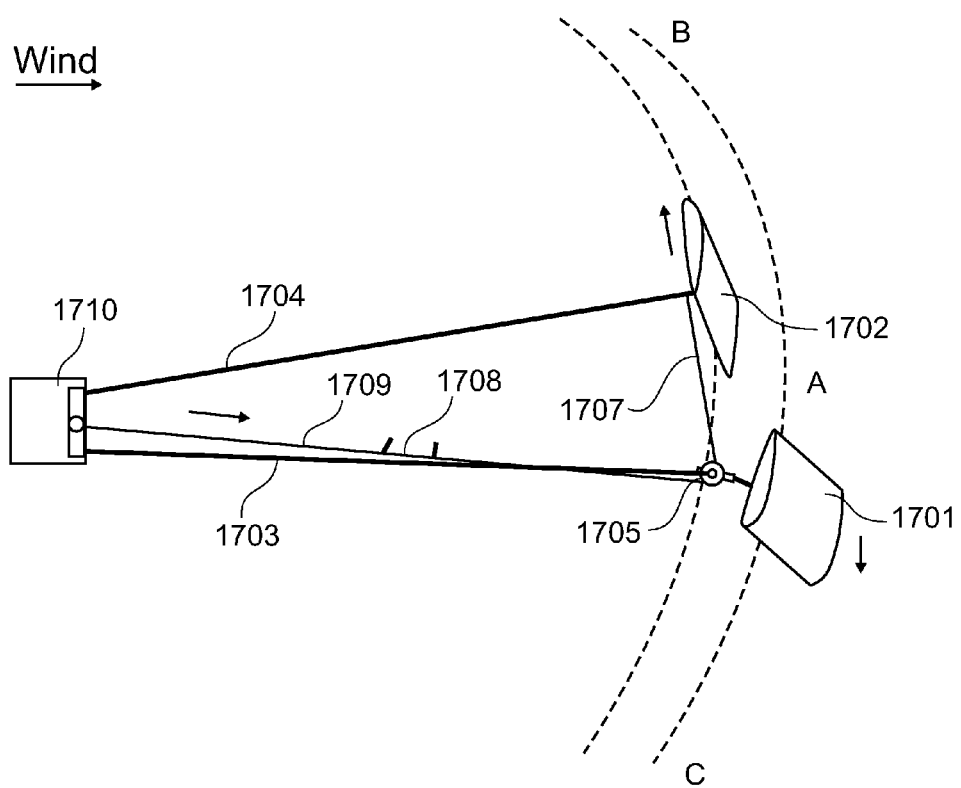
FIG. 17B is a top view of the WECD of FIG. 17A.

FIG. 17B shows top view of the same system (suspension lines 1706 are omitted for clarity). The arrows near the wings show the direction of the wing movement at a given moment, while the arrow near cable 1709 shows the direction of that cable movement in working phase. Leading wing 1701 and following wing 1702 have different angles to the wind and have different angles to the horizon, generally. This is because tension force of cable 1707 is different in direction and absolute value for these wings.

Figure 18:
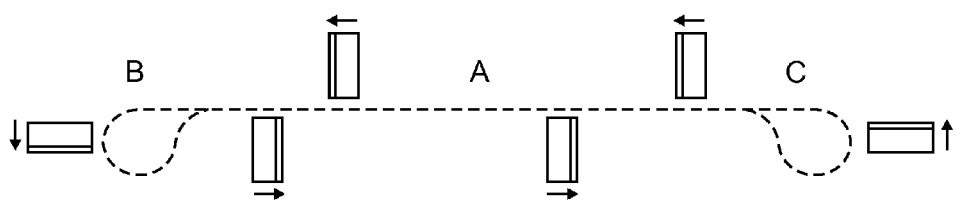
FIG. 18 is a schematic view of a wing motion of a WECD with two wings and a fork pulley.

FIG. 18 shows movement of wing 1701 or 1702 according to this embodiment, when viewed from the point where the wing's tether is attached to ground. The leading edge of the wing is designated by double line. The wing moves from point C to point B, then the control system 707 moves wing's control surfaces and wings turns 180 degrees in the visible plane. After completing this maneuver, the wing continues from point B to point C, where it makes 180 degree turn in the opposite direction.

The operating cycle of the system consists of two working phases and two returning phases. When wings 1701 and 1702 move away one from another, they pull cable 1707, which pulls cables 1708 and 1709. The cable 1709 pulls the rotor of the electrical generator, and electricity is generated. The lengthwise velocity component of cable 1709 has a scalar value significantly larger than the speed of the wind, as in other embodiments described above. This is a working phase. When wings 1701 and 1702 move one toward another, the pull of the wings on cables 1707, 1708 and 1709 is released. Drum 504 pulls the cable 1709 with small force. This is a returning phase, in which electricity is not generated and very small amount of it is spent to pull the cable 1709. In both phases each wing is set at such angle of attack as to generate some aerodynamic lift in vertical direction to maintain the wing in the air. The returning phase is shorter than the working phase, because wings do not have to spend power on rotating the generator.

With continuing reference to FIG. 18, in more detail, both wings are at point A in the cycle starting position.

Phase 1—Working: the leading wing moves from A to C, the following wing moves from A to B.

Phase 2—Returning: the leading wing moves from C to A, the following wing moves from B to A.

Phase 3—Working: the leading wing moves from A to B, the following wing moves from A to C.

Phase 4—Returning: the leading wing moves from B to A, the following wing moves from C to A, returning the system to the starting position.

The velocity of each wing in this embodiment should not differ significantly along the straight part of the trajectory and should be 2-20 times velocity of the wind, depending on L/D of the wing and other factors. Velocities of wings 1701 and 1702 can vary significantly between them. In this embodiment, the velocity of cable 1709 in the working phases equal to the sum of velocities of wings 1701 and 1702. Because of its high speed, cable 1709 can rotate the generator's rotor with 1500-1800 RPM, required for standard frequency electricity production, without a bulky and expensive gearbox. Since Power=Force×Velocity, the high speed of the cable 1709 translates into lower forces, acting on the cables 1707,1708 and 1709 and the elements of the ground station 110.

Wings 1701 and 1702 are brought down to the ground in case of extreme weather conditions (hurricanes, very strong or very weak winds, thunderstorms etc.) and for maintenance.

As in other embodiments, described above, an advantage over existing kite or tethered wing generators is achieved through much higher speed of cable or belt 1709, transferring mechanical energy of the moving wings to the energy producing means. Higher speeds translate into proportionally lower forces and higher RPMs, eliminating the need of a gearbox. This leads to much lower costs and higher reliability. Another advantage lies in the ability to use winds in very large range of altitudes, from tens meters to more than ten kilometers. Another advantage is derived through a more responsive control system.

The forces and the velocities in the different parts of the wing in this system do not change as much as they change in traditional horizontal axis wind turbines. This system does not require a tower or a gearbox. The generator is placed on the ground and can be easily accessed for maintenance. So, another advantage of this system of the invention over standard wind turbines is that it is less expensive for the same amount of energy produced, allows to tap higher quality of the wind resource at altitudes, capable of producing energy in more stable and predictable ways, uses less land, works on the altitudes where no birds or bats can be hit.

Figure 19A:
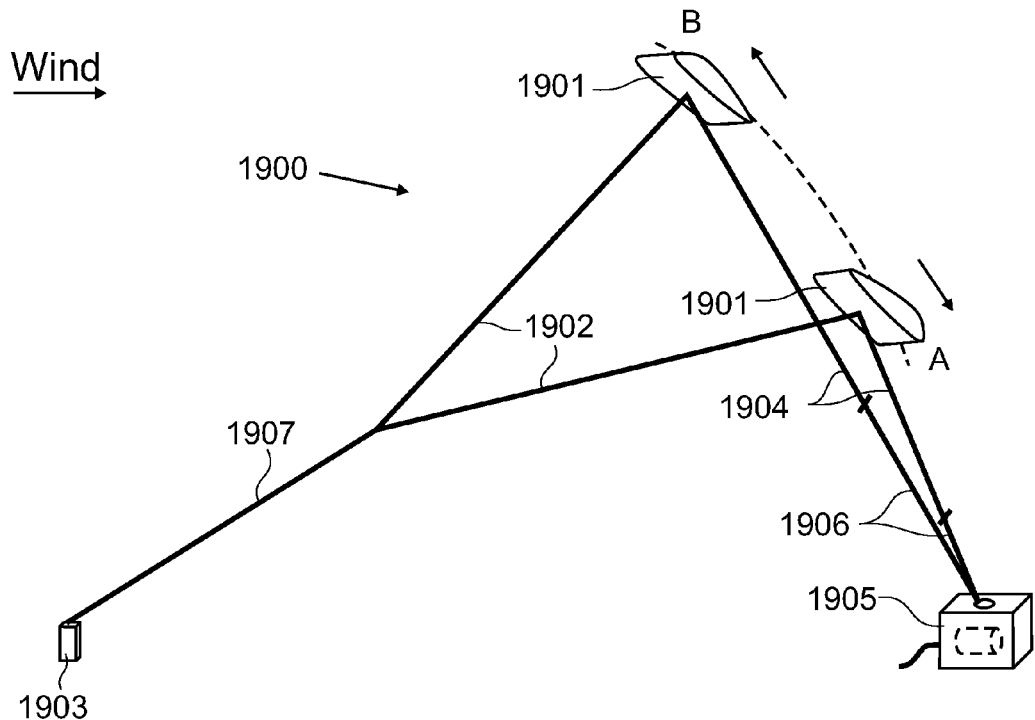
FIG. 19A is a perspective view of a WECD embodying the present invention with two wings moving in opposite directions.
Figure 19B:
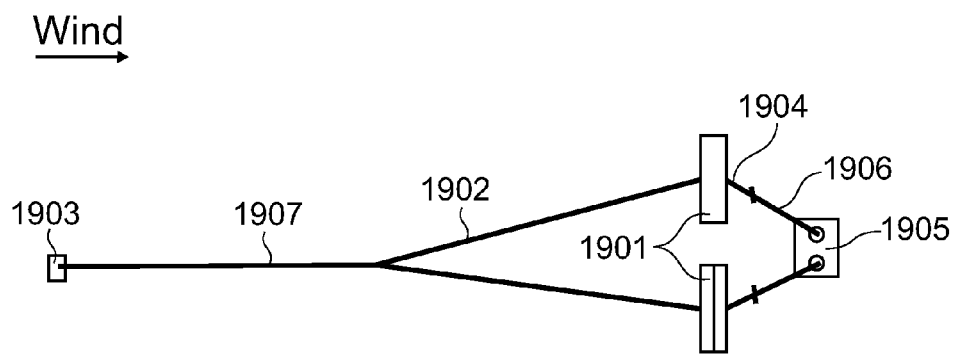
FIG. 19B is a top view of the WECD of FIG. 19A.
Figure 19C:
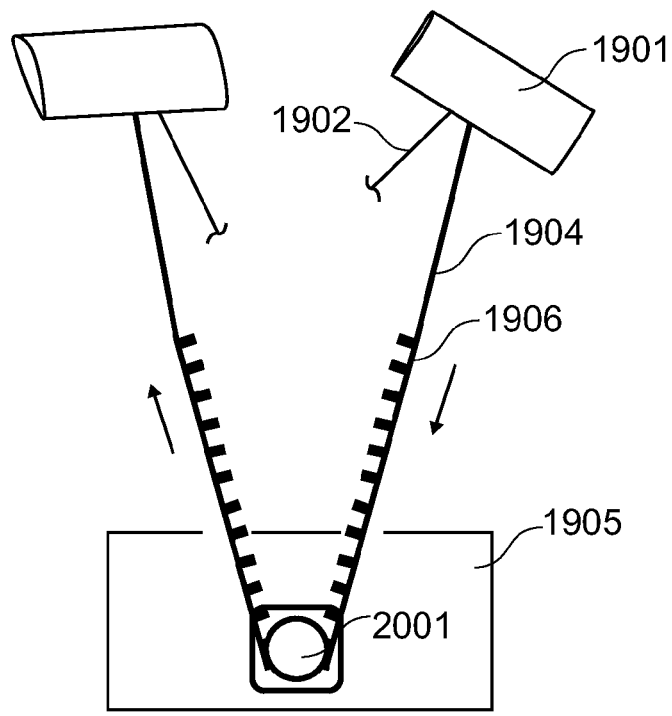
FIG. 19C is a partially sectional and schematic view of a WECD embodying the present invention with two wings moving in opposite directions.

A variation of the system, depicted in FIG. 1, is shown in FIG. 19A-C. This system comprises two sets 1900 of wings and cables. Each set 1900 comprises a wing 1901, attached with a cable 1902 to a tether 1907 which tethers it to a ground attachment point 1903. Wing 1901 pulls a motion transfer cable 1904. Both motion transfer cables 1904 are connected by a belt 1906, that transfers motion to a generator in a ground station 1905, as described below. Belt 1906 can be a flat belt, a ribbed belt, a toothed belt, a V-belt or another type of a belt, a chain or a cable. Arrows near the wings show their directions of movement in some moment of time.

FIG. 19B shows schematic top view of this embodiment in work. In this picture, one of the wings is flying up, while another one is flying down.

FIG. 19C shows how belt 1906 links wings 1901 through a pulley 2001. Rotation of pulley 2001 is transferred to the rotor of the generator, as described below. Attachments of cables 1902 are not shown to avoid clutter.

Figure 20:
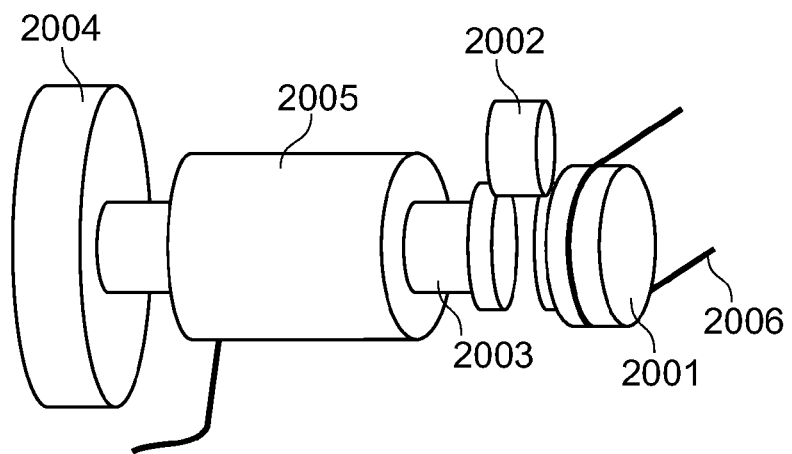
FIG. 20 is a perspective view of details of a transmission and flywheel in a ground station of a WECD embodying the invention with alternating belt motion.

FIG. 20 shows details of the drivetrain in this embodiment. Belt 1906 rotates pulley 2001. Pulley 2001 can be connected to a shaft 2003 of a rotor of a generator 2005 either directly or via an idler gear 2002. Optionally, a flywheel 2004 can be attached to rotor shaft 2003. This system has an advantage that it does not require a drum for winding and unwinding the cable, and allows utilizing the generator for 100% of the time. In this system, when the first wing 1901 flies away from ground station 1905, pulling cable 1904, which is pulling belt 1906, the second wing 1901 flies toward ground station 1905. The control system ensures orientation of the wing, that provides minimum air resistance to second wing 1901 or even wind push in the direction of the station. The wing, moving away from the ground station, generates substantial power, while the wing, moving toward the ground station does not consume any significant power. Belt 1906 is moving as shown in FIG. 19C, rotating pulley 2001. Idler gear 2002 is disengaged at this time, and rotation of pulley 2001 is transferred directly to rotor shaft 2003 of generator 2005. Generator 2005 generates electrical energy, which is transferred to the users. When belt 1906 approaches its end, the control system issues a command to the wings to reverse their direction. The first wing 1901 starts flying toward ground station 1905, the second wing 1901 starts flying away from ground station 1905. Belt 1906 starts moving in the opposite direction, rotating pulley 2001 in the opposite direction as well. Simultaneously, idler gear 2002 is engaged. Rotor shaft 2003 continues rotating in the same direction, moved by rotation of pulley 2001. When belt 1906 approaches its other end, the direction is reversed again, and so on. Thus, kinetic energy is applied to rotate rotor shaft 2003 for almost all of the time. Flywheel 2004, if present, helps to level power over short periods of disengagement between pulley 2001 and rotor shaft 2003, and over fluctuations in wind power. In the points A and B wings 1901 make U-turn by yawing or pitching, without losing much speed.

Figure 21A:
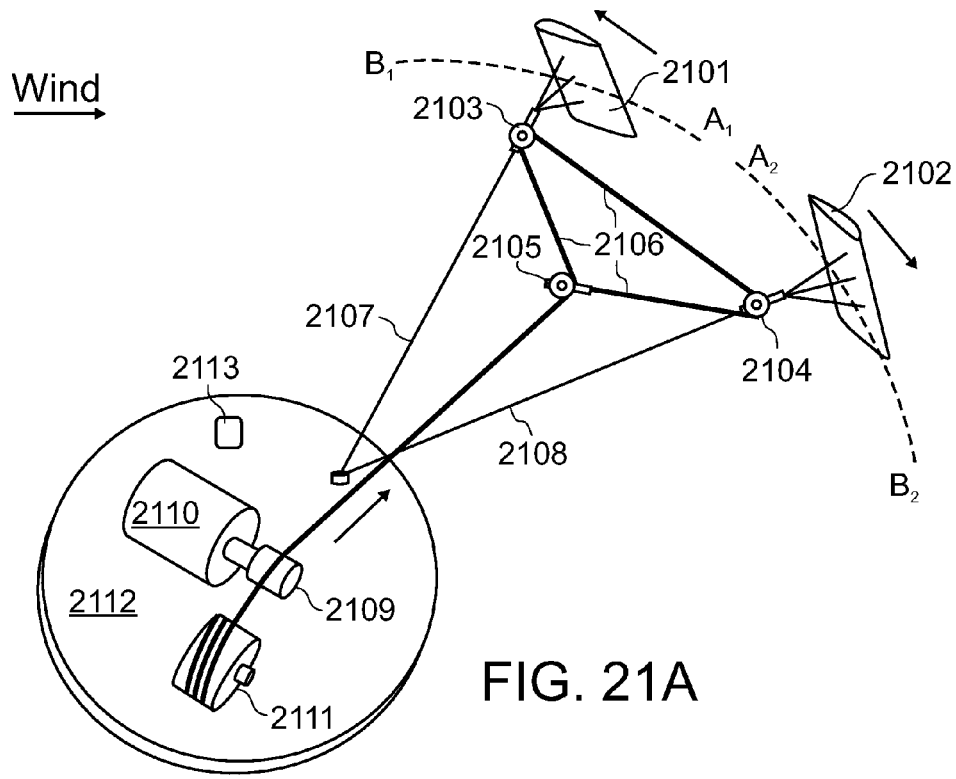
FIG. 21A is a top perspective view of a WECD with symmetrically connected wings carrying fork pulleys embodying the invention.
Figure 21B:
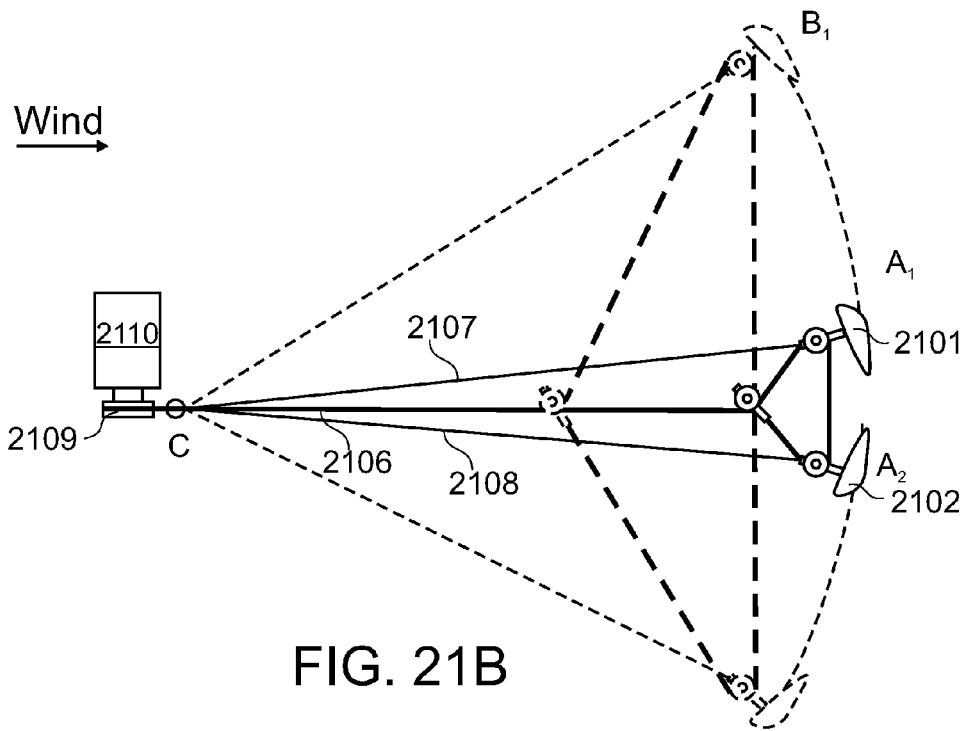
FIG. 21B is a schematic view of the wings' motion of the WECD of FIG. 21A.

An enhancement of the system from FIG. 17A-B is shown in FIG. 21A-B. In this system, a generator 2110, a belt drum 2111 and a sprocket or a pulley 2109 are installed on a rotating platform 2112. Two wings 2101 and 2102 are placed in the air. Wings 2101 and 2102 are tethered to platform 2112 by tethers 2107 and 2108, correspondingly. Each wing carries a fork pulley, which is suspended under the wing with suspension cables. Wing 2101 carries a fork pulley 2103, and wing 2102 carries a fork pulley 2104. A belt 2106 unwinds from drum 2111. The top end of belt 2106 is attached to a fork pulley 2105. From fork pulley 2105 attachment, belt 2106 wraps around fork pulley 2104, then wraps around fork pulley 2103, then around fork pulley 2105, descends and engages sprocket 2109. Considering balance of the forces at fork pulley 2105 and taking into account that the tension of the belt is equal along its length, it is easy to see that the fork pulleys are vertices of an isosceles triangle, with angles 30°, 30° and 120°. This property remains as the wings move toward or away from each other. The tethers have an average angle of 35° to the horizontal plane. The system operates in cycles, and each cycle consists of a working phase and a returning phase. FIG. 21A shows the system in the middle of the working phase.

In the beginning of the working phase, the wings are at points $A_1$ and $A_2$, and they begin to move away one from another. The solid lines in FIG. 21B illustrate the beginning of the working phase, and the end of the working phase is illustrated by the dashed lines. As wings 2101 and 2102 move away from one another, belt 2106 unwinds from drum 2111 and rotates sprocket 2109. The rotation of sprocket 2109 is transferred to the rotor of generator 2110. Therefore, the belts transfer mechanical power from the wings to the rotor of the electric generator, which converts the mechanical power into electrical power. The speed of the belt at the sprocket can be computed from geometrical considerations as $$v_b = \frac{dl}{dt}$$
$$= \frac{2dx}{dt}\left(1 + \frac{1}{\cos 30°}\right) - \frac{dx}{dt}\tan 30°$$
$$= v_{wing}\left(2 + \frac{2 - \sin 30°}{\cos 30°}\right)$$
$$\approx 3.732 v_{wing}$$

where $v_{wing}$ is the speed of the wing. When wings 2101 and 2102 arrive at the ends of the arcs (points B1 and B2), the working phase ends and the returning phase begins: the wings yaw (rotate in the plane of the wing) 180° and fly back. An electric motor rotates the drum, which winds the belt back onto them with a small expenditure of energy. Near points $A_1$ and $A_2$, wings 2101 and 2102 make another U-turn and come into position for the beginning of the working phase. Notice that through motion of wings 2101 between point B1 to B2 is also possible with a slightly different attachment of tethers 2107 and 2108 to platform 2112.

The system is omnidirectional. The altitude of the wings' motion can be anywhere between 200 m and 12 km, and it can be adjusted dynamically according to the current wind conditions. The working phase will only be half to two thirds of the cycle time, but a production deployment of this design can utilize multiple devices with time overlap. Within the working phase, the angle of attack of each wing should be controlled to ensure a constant speed and constant force acting on the belts, despite changes in the angle of the wings' motion toward the wind and each other, and wind variation. Note that the lightweight wings of this system are considerably more responsive than the heavy blades used in conventional wind turbines. A group of 2-3 such devices will generate grid quality AC current.

Figure 23A:
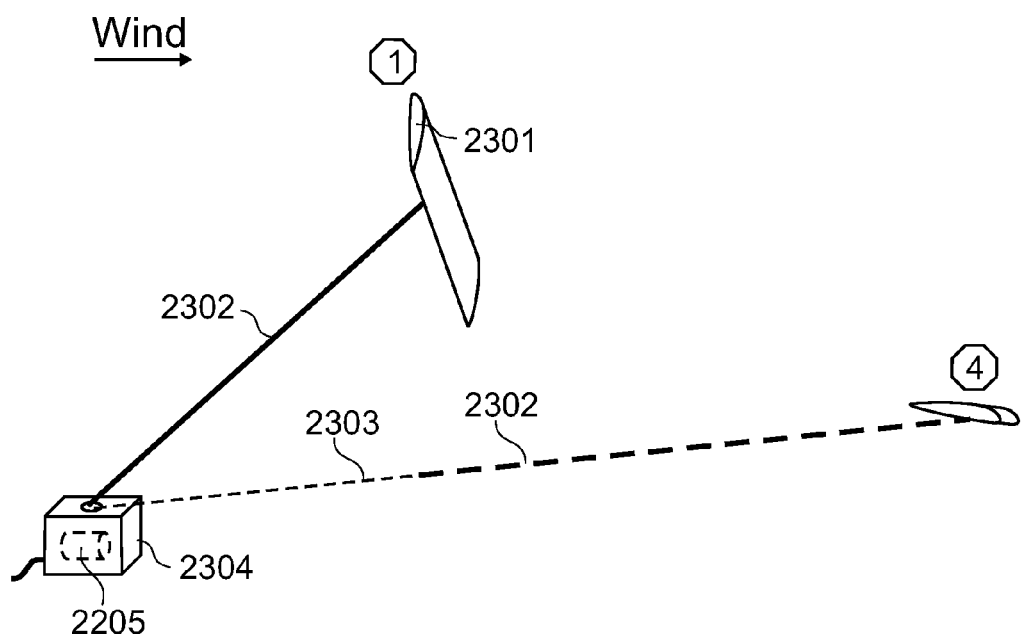
FIG. 23A is a side perspective view of a WECD with a heavy wing embodying the invention, showing two wing positions.
Figure 23B:
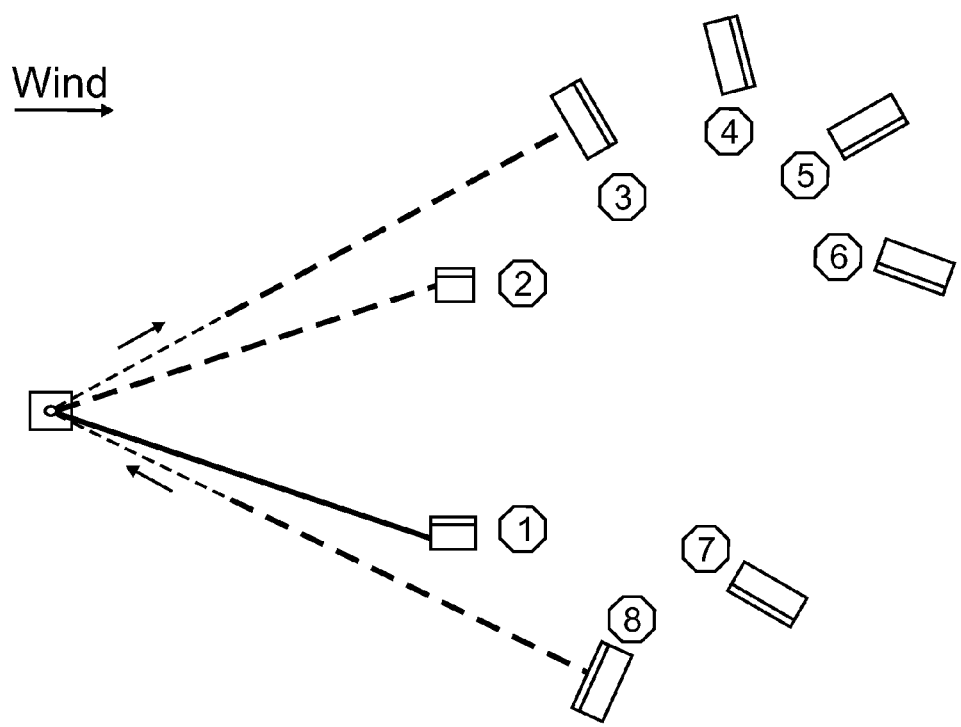
FIG. 23B is a schematic top view of multiple positions of wings in a WECD of the present invention having a heavy wing.
Figure 23C:
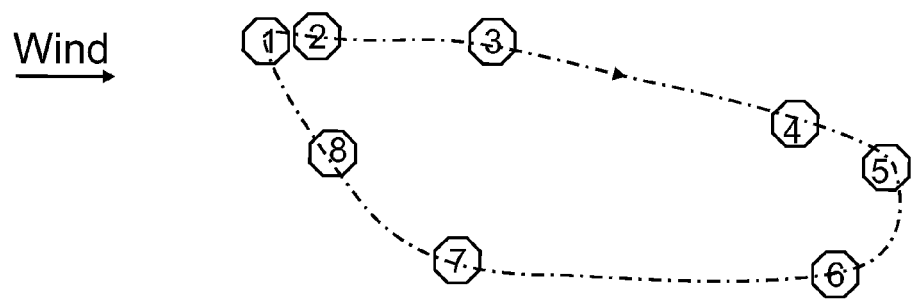
FIG. 23C is a schematic side view of multiple positions of wings in a WECD of the present invention having a heavy wing.

FIG. 23A-C shows one more embodiment of the invention—airborne wind energy conversion system with a ground generator and a heavy wing. In this embodiment, phases of energy accumulation by the wing and energy transfer to the ground generator are separated in time.

Heavy wing means that the wing has sufficient mass to accumulate substantial kinetic or potential energy, which can be used to drive the ground based generator when the wing does not harvest substantial energy from wind. Numerically, heavy wing can be defined as a wing having mass of more than 10 kg per $m^2$ of surface (as an example). The weight includes everything, carried on the wing, plus two thirds of the weight of the cable, attaching it to the ground or the ground platform.

This embodiment comprises a heavy airborne wing 2301. FIG. 23B is a top view of movement of wing 2301, with its eight consecutive positions in the air marked by numbers in octagons. Wing is shown as a rectangle with its leading edge shown by double line. Arrows near dashed lines show direction of movement of a motion transfer cable 2302. Wing 2301 always moves with its leading edge forward. To avoid clutter, cables are shown only for positions 1, 2, 3 and 8. FIG. 23C is a side view of movement of wing 2301, with eight consecutive positions marked by numbers in octagons. No cables are shown. FIG. 23A shows wing 2301 in two positions: position 1 (cable 2302 in solid lines) and position 8 (cable 2302 and a belt 2303 in dashed lines). An electric generator 2305 is installed inside of a ground station 2304. Cable 2302 and belt 2303 are used to transfer energy, harvested by wing 2301, to the rotor of generator 2305.

In FIG. 23B, eight consecutive positions of a wing 2301 are shown best. The operation of this embodiment has three phases: the phase of energy harvesting (between positions 1 and 2), the phase of energy transfer (between positions 2 and 4) and the phase of return (between positions 4 and 8 and from 8 to 1). In this embodiment, harvested mechanical energy is accumulated mostly as kinetic energy of wing 2301. Referring to FIG. 23A, wing 2301 in position 1 is attached to ground station 2304 with cable 2302. In positions 3 and 4, cable 2302 is detached from ground station 2304 and is pulling after itself belt 2303.

Figure 22:
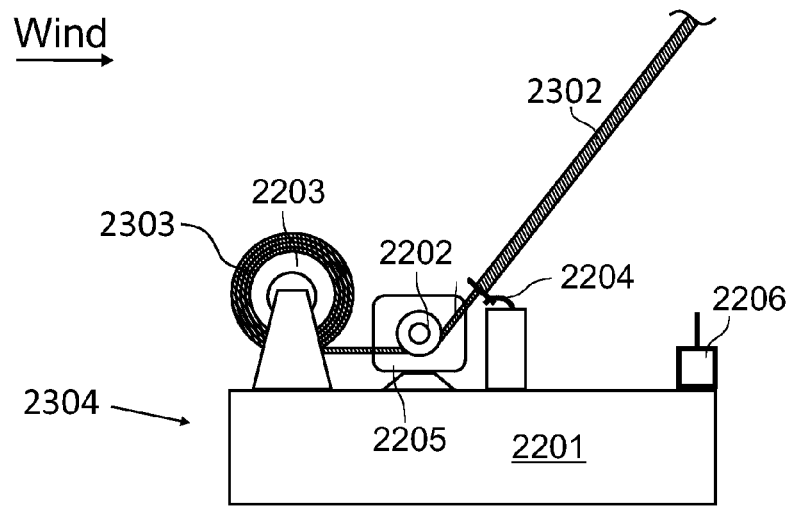
FIG. 22 is a schematic view of details of a ground station embodying the invention in a WECD with a heavy wing.

FIG. 22 shows details of ground station 2304. Belt 2303 winds on/unwinds off a drum 2203. When belt 2303 unwinds off drum 2203, it rotates a pulley or a sprocket 2202 which rotates the rotor of generator 2205. The end of cable 2302 is held attached to a platform 2201 by a hook (or a clamp, a ratchet or any similar device) 2204 between the wing positions 1 and 2. Hook 2204 is released, when wing 2301 passes position 2. A control system 2206 is provided to control all aspects of operation of the system. It should be noticed, that a ground station with separate cable drum and motion converting pulley or sprocket can be used in other embodiments of the invention as well.

Returning to FIG. 23B and FIG. 23C. Wing 2301 accumulates energy of wind, moving crosswind from position 1 to position 2 in horizontal plane. Its lateral axis is inclined to horizon (the angle can be 15°-45° and the vertical component aerodynamic lift keeps wing 2301 in the air, while the horizontal component accelerates it along the circular arc between positions 1 and 2. In position 2 platform attachment of wing 2301 is released, as described above. Directed by the control system and steered by its control surfaces, wing 2301 changes its direction to fly away from ground station 2304. While flying away from ground station 2304, wing 2301 is pulling cable 2302 which is pulling belt 2303, transferring kinetic energy of wing's motion to the rotor of electric generator 2205, that converts this kinetic energy into electrical energy. Energy transfer happens between positions 2 and 4. In order to maintain speed, with which belt 2303 unwinds, wing 2301 can descend between the position 2 and the position 4, as shown in FIG. 23C. Then wing 2301 turns and glides through positions 5, 6, 7 to position 8. In position 8, wing 2301 turns and ascends, coming back to position 1. In the same time (phase of return, from position 4 to 1), drum 2203 is rotated by its small electric motor, pulling back belt 2303. Pulley or sprocket 2202 is engaged with the rotor of generator 2205 only in the phase of energy transfer. When wing 2301 comes back to position 1, all of belt 2303 is already pulled back and most of it is wrapped on drum 2203, and then hook 2204 hooks the end of cable 2302, attaching it to ground station 2304. Then the cycle repeats. Velocity of wing has its minimum in position 1 and its maximum in position 2.

The wing trajectory illustrated and described above is for an example. Many other closed or nearly closed trajectories in three dimensional space in the air would work, as long as wing 2301 is tethered and flies crosswind in its power harvesting phase, and flies away from ground station 2304 in its power transfer phase, and stays within flying envelope for its wing loading.

In this embodiment the pull force of wing 2301 in energy transfer phase is significantly lower, than the energy harvesting phase. Thus, belt 2303 can be made to withstand lower tension, than cable 2302.

More than one wing 2301 can be attached to a single generator and operate in such way, that their energy transfer phases happen in different times, and kinetic energy is supplied to the rotor of generator 2205 continuously.

Sample parameters for the system in one variant of this embodiment:

Wingspan: 100 m
Wings Chord: 4 m
Wing Weight per m$^2$: 50 kg/m$^2$
Weight: 20,000 kg
Minimum Speed: 100 m/s
Maximum Speed: 200 m/s
Harvesting Phase Altitude: 6,000 m
Maximum Altitude Drop: 2,000 m
Cable 102 Length: 10,000 m
Average Power Output: 5-10 MW As in the previous embodiments, one advantage of these embodiments is derived from the high lengthwise speed of belt 2303 in the motion transfer phase that translates in high angular speed of the pulley, rotating the rotor of the ground generator, and low forces on the equipment. Another advantage is simplicity of construction and operation, and its low cost.

Figure 24:
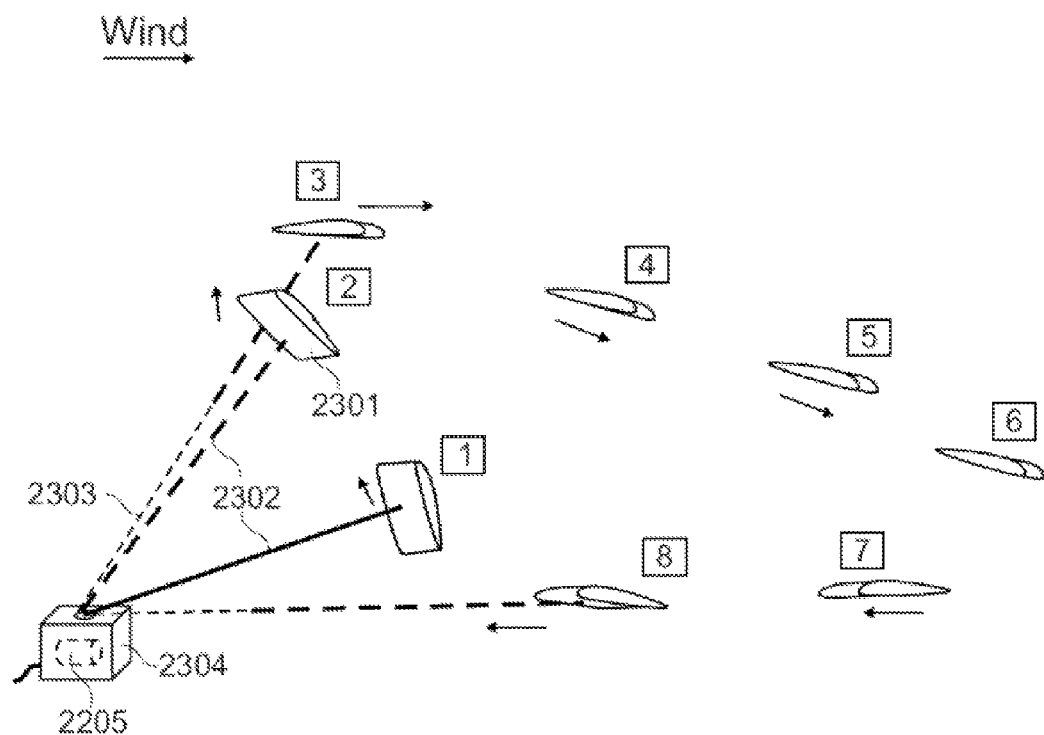
FIG. 24 is a schematic side view of multiple positions of wings in a WECD embodying the present invention with a heavy wing with a different wing trajectory.

FIG. 24 shows another variation of the system with the heavy wing, side view. The main distinction is that harvested wind energy is accumulated mostly in the form of potential energy of wing 2301. In FIG. 24, eight consecutive positions of a wing 2301 are shown by numbers in squares. Arrows near the wings show direction of the wing's motion. This embodiment has three phases: the phase of energy harvesting (between positions 1 and 2), the phase of energy transfer (between positions 2 and 6) and the phase of return (between positions 6 and 8 and from 8 to 1). In this embodiment, harvested mechanical energy is accumulated mostly as potential energy of wing 2301. Wing 2301 in the positions 1 and 2 is attached to a ground station 2304 with a cable 2302. In other positions, cable 2302 is detached from platform 2304.

Wing 2301 accumulates energy of wind, moving crosswind from position 1 to position 2 in a vertical circular arc. In position 2 platform attachment of wing 2301 is released. Directed by control system 2206 and steered by its control surfaces, wing 2301 changes its direction to fly away from ground station 2304. While flying away from ground station 2304, wing 2301 is pulling cable 2302 which is pulling belt 2303, transferring energy of its motion to the rotor of electric generator 2205, that converts mechanical energy into electric energy. Control system 2206 attempts to keep speed, with which belt 2303 winds off from its drum, constant. Speed of wing 2301 is maintained because of its descent. Energy transfer happens between positions 2 and 6. Wing 2301 turns and glides through the positions 7 and 8 back to the position 1. In the phase of return, drum 2203 is rotated by its small electric motor, pulling back belt 103. Pulley 2202 is engaged with the rotor of generator 2205 only in the phase of energy transfer. When wing 2301 comes back to position 1, the cycle repeats.

In variations of these embodiments, multiple wing systems can be ultimately connected to a single electrical generator. Length of tether 102 can be (slowly) variable.

Some embodiments, described above, were described in conjunction with land location. Nevertheless, they can be practiced in a sea or ocean location. When located in a sea or an ocean, the ground station can be deployed on columns or on a floating structure, anchored to the bottom. The tethers can be attached to similar columns or structures, or directly to the bottom, or to floating buoys, anchored to the bottom.

For higher efficiency, multiple ground stations can be combined in a single wind farm. Combining outputs of multiple ground stations will make power output smoother. Additional advantage of a wind farm is better use of the land under flying wings and cables. Mechanized attachment points from FIGS. 3A and 3B can be reused for multiple wings, working with different ground stations. Such farm can be combined with an energy storage or an auxiliary fossil fuel generator, guaranteeing certain minimum of power, provided to the grid, even when the wind is absent.

In another aspect of the invention, the wings can move in water instead of air. The wind is replaced by the current. The ground station can be installed on the bottom of the river or on a seabed, or anchored to the bottom, and the wings are working in the water. Also, the ground station can be floating on the surface, anchored to the bottom or to river banks, and the wings are "flying" in the water upside down, powered by the current. The wings may have neutral buoyancy and move horizontally. When wings are working in the water, the systems with mostly horizontal movement of the wings are preferred over the systems with mostly vertical one because of potential damage that may be caused to ecological system by wings mixing water at different depths.

Wind energy conversion devices can benefit from using a cable with decreased aerodynamic drag for tether and/or suspension cables. Such aerodynamic cable can have a section in the form of streamlined body, and be built with a core rope of high strength fibers, a streamlined jacket and a foam filler. In some embodiments above, a perforated belt and a sprocket on the ground can be used instead of a cable and a pulley on the ground, and vice versa.

Thus, an airborne wind energy conversion system with fast motion transfer is described in conjunction with multiple specific embodiments. While the above description contains many specificities, these should not be construed as limitations on the scope, but rather as exemplification of several embodiments thereof. Many other variations are possible.

What is claimed is:

1. A wind energy conversion system, comprising:
    a single airborne wing having attached aerodynamic controls;
    a tether, attached to a stationary object on the ground or in the water at a first end thereof, and coupled to the wing at a generally opposite second end thereof, the length of the tether between the stationary object and the wing being fixed;
    a ground-based or water-based electric generator including a rotor and a stator;
    a motion transfer cable, in addition to the tether, coupled to the wing and transferring motion of the wing to the rotor of the generator; and
    an electronic control system adapted to control flight of the wing.

2. The system of claim 1, wherein the generator is disposed on a moving member to accommodate changes in the wind direction.

3. The system of claim 1, wherein the wing is rigid and comprises at least two control surfaces.

4. The system of claim 1, wherein the wing carries at least a portion of the electronic control system.

5. The system of claim 1, wherein the control system comprises at least one microprocessor, at least one sensor and at least one actuator.

6. The system of claim 1, wherein the lengthwise velocity component of the cable has a scalar value between four and thirty times the concurrent wind speed.

7. The system of claim 1, wherein the cable is coupled to the wing through one or more suspension cables.

8. The system of claim 1, wherein the wing accumulates mechanical energy in one phase, and transfers the mechanical energy to the generator in another phase.

9. The system of claim 1, wherein an angle between the cable and the direction of the wing motion is less than forty-five degrees.

10. The system of claim 1, wherein the cable and the tether form an angle of at least forty-five degrees.

11. The system of claim 1, wherein the cable has at least a forty-five degree angle with respect to wind direction.

12. The system of claim 1, wherein the wing moves crosswind faster than the speed of the wind at an angle of between forty-five and ninety degrees with respect to the direction of the wind at least a portion of the time.

13. The system of claim 1, wherein the wing is attached to the tether by a plurality of suspension cables.

14. The system of claim 1, wherein a lengthwise velocity component of the cable has a greater scalar value than a concurrent wind speed at an altitude of the wing.

15. The system of claim 1, further comprising:
    a ground-based or water-based sprocket rotationally coupled to the rotor of the electric generator;
    a belt coupled to the motion transfer cable and adapted to transfer its motion to the sprocket; and
    a drum, from which the belt is capable to unwind.

16. A wind energy conversion system, comprising:
    a single airborne wing having attached aerodynamic controls;
    a tether, attached to a stationary object on the ground or in the water at a first end thereof, and coupled to the wing at a generally opposite second end thereof, the length of the tether between the stationary object and the wing being fixed;
    a ground-based or water-based electric generator including a rotor and a stator; and
    a motion transfer cable, in addition to the tether, coupled to the wing and transferring motion of the wing to the rotor of the generator;
    wherein a lengthwise velocity component of the cable has a greater scalar value than a concurrent wind speed at an altitude of the wing.

17. The system of claim 16, further comprising an electronic control system adapted to control flight of the wing.

18. The system of claim 17, wherein the electronic control system comprises at least one microprocessor, at least one sensor, and at least one actuator, and wherein at least a portion of the electronic control system is carried by the wing.

19. The system of claim 16, further comprising:
    a ground-based or water-based sprocket rotationally coupled to the rotor of the electric generator;
    a belt coupled to the motion transfer cable and adapted to transfer its motion to the sprocket; and
    a drum, from which the belt is capable to unwind.

20. The system of claim 16, wherein the lengthwise velocity component of the cable has a scalar value between four and thirty times the concurrent wind speed.

21. The system of claim 16, wherein the generator is disposed on a moving member to accommodate changes in the wind direction.

22. The system of claim 16, wherein the wing is rigid and comprises at least two control surfaces.

23. The system of claim 16, wherein the cable is coupled to the wing through one or more suspension cables.

24. The system of claim 16, wherein the wing accumulates mechanical energy in one phase, and transfers the mechanical energy to the generator in another phase.

25. The system of claim 16, wherein an angle between the cable and the direction of the wing motion is less than forty-five degrees.

26. The system of claim 16, wherein the cable and the tether form an angle of at least forty-five degrees.

27. The system of claim 16, wherein the cable has at least a forty-five degree angle with respect to wind direction.

28. The system of claim 16, wherein the wing moves crosswind faster than the speed of the wind at an angle of between forty-five and ninety degrees with respect to the direction of the wind at least a portion of the time.

\* \* \* \* \*